US012452347B2

(12) United States Patent
Li et al.

(10) Patent No.: US 12,452,347 B2
(45) Date of Patent: *Oct. 21, 2025

(54) COMMUNICATION METHOD, COMMUNICATIONS DEVICE, AND STORAGE MEDIUM

(71) Applicant: HUAWEI TECHNOLOGIES CO., LTD., Guangdong (CN)

(72) Inventors: Aini Li, Shenzhen (CN); Li Mei, Shenzhen (CN); Qiwen Zhong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/484,928

(22) Filed: Oct. 11, 2023

(65) Prior Publication Data

US 2024/0040018 A1 Feb. 1, 2024

Related U.S. Application Data

(63) Continuation of application No. 16/751,907, filed on Jan. 24, 2020, now Pat. No. 11,824,960, which is a (Continued)

(30) Foreign Application Priority Data

Jul. 24, 2017 (CN) .......................... 201710608033.8

(51) Int. Cl.
H04L 69/18 (2022.01)
H04J 14/08 (2006.01)
(Continued)

(52) U.S. Cl.
CPC ............ H04L 69/18 (2013.01); H04J 14/086 (2013.01); H04L 69/08 (2013.01); H04J 2203/0085 (2013.01); H04L 1/0006 (2013.01)

(58) Field of Classification Search
CPC ............ H04J 14/086; H04J 2203/0085; H04L 1/0006; H04L 41/0809; H04L 69/08
See application file for complete search history.

(56) References Cited

U.S. PATENT DOCUMENTS

2012/0198279 A1 8/2012 Schroeder
2016/0119075 A1 4/2016 Gareau et al.
(Continued)

FOREIGN PATENT DOCUMENTS

CN 101772058 A 7/2010
CN 102651777 A 8/2012
(Continued)

OTHER PUBLICATIONS

Optical Internetworking Forum, "Flex Ethernet Implementation Agreement", IA # OIF-FLEXE-01.1, Jun. 21, 2017, 35 pages.
(Continued)

Primary Examiner — Zhensheng Zhang
(74) Attorney, Agent, or Firm — Fish & Richardson P.C.

(57) ABSTRACT

Communication methods, apparatuses, systems, and storage media are provided, to implement communication between a port and another port supporting both a flexible Ethernet protocol and a standard Ethernet protocol. In an example, a port of a first device supports a flexible Ethernet protocol and a standard Ethernet protocol, and a protocol type supported by a port of a second device includes the flexible Ethernet protocol and/or the standard Ethernet protocol. The first device obtains the protocol type supported by the port of the second device, determines a target protocol type based on the protocol type supported by the port of the second device and a protocol type supported by the port of the first device, and communicates with the second device based on the target protocol type. The target protocol type includes the flexible Ethernet protocol or the standard Ethernet protocol.

23 Claims, 14 Drawing Sheets

Related U.S. Application Data continuation of application No. PCT/CN2018/095001, filed on Jul. 9, 2018.

(51) Int. Cl.
  *H04L 69/08* (2022.01)
  *H04L 1/00* (2006.01)

(56) References Cited

U.S. PATENT DOCUMENTS

| | | | |
|---|---|---|---|
| 2017/0111718 A1 | 4/2017 | Wang et al. | |
| 2018/0013511 A1* | 1/2018 | Hussain | G02B 6/12033 |
| 2018/0123714 A1 | 5/2018 | Zhong et al. | |
| 2018/0159785 A1* | 6/2018 | Wu | H04J 3/1658 |
| 2019/0372717 A1 | 12/2019 | Zhang et al. | |

FOREIGN PATENT DOCUMENTS

| | | |
|---|---|---|
| CN | 106341207 A | 1/2017 |
| CN | 106612203 A | 5/2017 |
| CN | 106803811 A | 6/2017 |
| CN | 106911426 A | 6/2017 |
| WO | 2014140952 A1 | 9/2014 |
| WO | 2016000146 A1 | 1/2016 |

OTHER PUBLICATIONS

Huang et al., "Framework and Requirements for GMPLS-based Control of Flexible Ethernet Network; draft-huang- flexe-framework-00.txt",XP015115079, Sep. 1, 2016, 19 pages.

Optical Internetworking Forum, "Flex Ethernet 2.0, Implementation Agreement", OIF-FLEXE-02.0, Jun. 22, 2018, 51 pages.

IEEE Std 802.3-2015, IEEE Standard for Ethernet, IEEE Computer Society, Sponsored by the LAN/MAN Standards Committee, Approved Sep. 3, 2015, 4017 pages.

IEEE Std 802.1AB™-2016, IEEE Standard for Local and metropolitan area networks—Station and Media Access Control, Connectivity Discovery, Jan. 29, 2016, 146 pages.

Optical Internetworking Forum, Flex Ethernet, Implementation Agreement, IA # OIF-FLEXE-01.0, Mar. 2016, 31 pages.

Extended European Search Report issued in European Application No. 18838748.4 on Apr. 6, 2020, 8 pages.

PCT International Search Report and Written Opinion in International Application No. PCT/CN2018/095,001, dated Sep. 14, 2018, 15 pages (With English Translation).

Office Action issued in Chinese Application No. 201710608033.8 on Dec. 2, 2019, 14 pages (With English Translation).

* cited by examiner

| Destination address (DA) | Source address (SA) | Type (Type) | Data (Data) | Frame check sequence (FCS) |

| Bits 00 | Bits 01 | Bits 02-09 | Bits 10-17 | Bits 18-25 | Bits 26-33 | Bits 34-37 | Bits 38-68 |
|---|---|---|---|---|---|---|---|
| 1 | 0 | 0x4B | D1 | 0x?? | 0x03 | 0x0 | 0x5 0x000_0000 |
| 1 | 0 | 0x4B | D1 | D2 | D3 | 0x5 | 0x5 0x000_0000 |

FIG. 10

| Lane (Lane) 0 | Lane 1 | Lane 2 | Lane 3 | Lane 4 | Lane 5 | Lane 6 | Lane 7 | Description (Description) |
|---|---|---|---|---|---|---|---|---|
| 0x9C | See FIG. 12 | See FIG. 12 | 0x03 | 0x00 | 0x00 | 0x00 | 0x00 | Capability ordered set (Capability Ordered set) |
| 0x9C | See FIG. 13 | See FIG. 13 | 0x04 | 0x00 | 0x00 | 0x00 | 0x00 | Status ordered set (Status Ordered set) |

FIG. 11

| Lane (Lane) 1 | Bit 0 | Flexible Ethernet protocol (aware mode) capability (FlexE Mode (aware) Capable) | 1: can work in this mode; 0: cannot work in this mode |
|---|---|---|---|
| Lane 1 | Bit 1 | Flexible Ethernet protocol (terminated mode) capability (FlexE Mode (terminated) Capable) | 1: can work in this mode; 0: cannot work in this mode |
| Lane 1 | Bit 2 | Standard Ethernet protocol (full-bandwidth MAC) capability (StdE Mode (Full BW MAC) Capable) | 1: can work in this mode; 0: cannot work in this mode |
| Lane 1 | Bits 3-7 | 0000 | Reserved |
| Lane 2 | Bits 0-7 | Flexible Ethernet group capability token (FlexE Group Capability key) | FlexE group capability token |

FIG. 12

| Lane (Lane) 1 | Bit 0 | Flexible Ethernet protocol (aware mode) (FlexE Mode (aware)) | Whether this mode function is activated: 1: Yes; 0: No |
|---|---|---|---|
| Lane 1 | Bit 1 | Flexible Ethernet protocol (terminated mode) (FlexE Mode (terminated)) | Whether this mode function is activated: 1: Yes; 0: No |
| Lane 1 | Bit 2 | Standard Ethernet protocol (full-bandwidth MAC) (StdE Mode (Full BW MAC)) | Whether this mode function is activated: 1: Yes; 0: No |
| Lane 1 | Bits 3-7 | 0000 | Reserved |
| Lane 2 | Bits 0-7 | 0x00 | Reserved |

FIG. 13

| Byte | Field |
|---|---|
| 1st byte | Type value (TLV type)=127 (7 bits) |
| 2nd byte | Length (length) (9 bits) |
| 3rd–5th bytes | Optical internetworking forum organizationally unique identifier OIF-OUI: 00-0F-40 |
| 6th byte | Subtype (Subtype): 0x?? |
| 7th byte | Interface capability (Interface capabilities) (1 byte) |
| 8th–11th bytes | Flexible Ethernet protocol group capability token (FlexE Group Capability Key) (4 bytes) |
| 12th byte | Maximum quantity of interfaces supported in a flexible Ethernet group (Max #of PHYs in a FlexE group/subgroup) (1 byte) |
| 13th byte | To be determined (To be determined, TBD) |

| Bit | Interface capabilities |
|---|---|
| 1 | "1": Flexible Ethernet protocol; "0": Null (Null) |
| 2 | "1": Standard Ethernet protocol; "0": Null (Null) |
| 3–8 | Reserved (Reserved) |

FIG. 16

COMMUNICATION METHOD, COMMUNICATIONS DEVICE, AND STORAGE MEDIUM

CROSS-REFERENCE TO RELATED APPLICATIONS

This application is a continuation of U.S. patent application Ser. No. 16/751,907 filed on Jan. 24, 2020, which is a continuation of International Application No. PCT/CN2018/095001, filed on Jul. 9, 2018, which claims priority to Chinese Patent Application No. 201710608033.8, filed on Jul. 24, 2017. All of the aforementioned patent applications are hereby incorporated by reference in their entireties.

TECHNICAL FIELD

This application relates to the communications field, and in particular, to a communication method, a communications device, and a storage medium.

BACKGROUND

A related standard of an 802.3 standard Ethernet (StdE) defined by the institute of electrical and electronics engineers (IEEE) is widely cited in the industry. The standard Ethernet is very popular with manufacturers because of a simple principle, easy implementation, and a low price. However, with development of technologies, a bandwidth granularity difference is increasingly large, and a deviation between an interface of the standard Ethernet and an actual application requirement is also increasingly large. The following case is most likely to appear: A bandwidth required by a mainstream application does not belong to any existing Ethernet standard rate. For example, resources are wasted if a 100 GE port is used to carry a 50 Gb/s service, and there is no corresponding Ethernet standard granularity for carrying a 200 Gb/s service.

To address this challenge, an optical Internet forum (OIF) releases a flexible Ethernet (FlexE). The FlexE is a general technology that supports a plurality of Ethernet MAC layer rates. A plurality of 100 GE (Physical, PHYs) interfaces are bound, and each 100 GE port is divided into 20 slots in time domain by using 5G as a granularity, so that the FlexE can support the following functions: a binding function, that is, a plurality of Ethernet interfaces are bound to form one link group to support a medium access control (MAC) service whose rate is greater than that of a single Ethernet interface; a sub-rate function, that is, a slot is allocated to a service to support a MAC service whose rate is less than a link group bandwidth or less than a bandwidth of a single Ethernet interface; and a channelization function, that is, a slot is allocated to a service to simultaneously transmit a plurality of MAC services in a link group, for example, one 150G MAC service and two 25G MAC services can be simultaneously transmitted in a 2×100 GE link group.

Based on the foregoing case, an Ethernet port may have two protocol modes: a standard Ethernet protocol and a flexible Ethernet protocol. Currently, a communication solution is urgently required to implement communication between Ethernet ports of this type.

SUMMARY

Embodiments of this application provide a communication method, a communications device, and a storage medium, to implement communication between another port and a port supporting both a flexible Ethernet protocol and a standard Ethernet protocol.

According to a first aspect, an embodiment of this application provides a communication method. In the method, a first device obtains a protocol type supported by a second port of a second device, where the protocol type supported by the second port of the second device includes a flexible Ethernet protocol and/or a standard Ethernet protocol, and a first port of the first device supports the flexible Ethernet protocol and the standard Ethernet protocol; the first device determines a target protocol type based on the protocol type supported by the second port and a protocol type supported by the first port, where the target protocol type includes the flexible Ethernet protocol or the standard Ethernet protocol; and the first device communicates with the second device based on the target protocol type through the first port and the second port.

The first device in this embodiment of this application may include one or more ports. The first port in this embodiment of this application is specifically a port that is of the first device and that can support two types of protocols. To be specific, one or more ports that are of the first device and that support two protocol types may be referred to as first ports. The second device may also include one or more ports, and the second port is a port that is of the second device and that has a link with the first port. The second port may support one protocol type, such as the standard Ethernet protocol or the flexible Ethernet protocol; or the second port may support two types of protocols. When the second port supports two protocol types, the second port may also perform a solution similar to a solution performed by the first port in this embodiment of this application. For specific content, refer to descriptions in subsequent embodiments.

In this embodiment of this application, the port of the first device supports the flexible Ethernet protocol and the standard Ethernet protocol, and the protocol type supported by the port of the second device includes the flexible Ethernet protocol and/or the standard Ethernet protocol. The first device obtains the protocol type supported by the port of the second device, determines the target protocol type based on the protocol type supported by the port of the second device and the protocol type supported by the port of the first device, and communicates with the second device based on the target protocol type. The target protocol type includes the flexible Ethernet protocol or the standard Ethernet protocol. In this way, communication between another port and a port supporting both the flexible Ethernet protocol and the standard Ethernet protocol is implemented.

In a possible design, after the first device determines the target protocol type, the first device sends information to the second port of the second device based on the target protocol type through the first port, so that the second port can successfully parse the information sent from the first port. In a possible design, after the first device determines the target protocol type, the first device receives, based on the target protocol type through the first port, information sent from the second port of the second device, so that the first port can successfully parse the information sent from the second port. In a possible design, the first device sends information to the second port of the second device based on the target protocol type through the first port, and receives, based on the target protocol type through the first port, information sent from the second port of the second device, so that a protocol type used by the first port to send information is consistent with a protocol type used by the first port to receive information.

Therefore, the first port better communicates with the second port, and the first port and the second port are also easily managed.

In a possible design, before the first device determines the target protocol type, the method further includes: obtaining, by the first device by using a physical coding sublayer PCS code block, a protocol type currently used by the second port to send information. To be specific, indication information used to indicate the protocol type supported by the second port is carried in the PCS code block. Therefore, when two ports transmit information to each other by using the PCS code block, PCS layer information can still be parsed even if protocol types used by the two ports are different. Based on this, in this embodiment of this application, the indication information used to indicate the protocol type supported by the second port is transmitted by using the PCS code block. Even if a protocol type used by the first port to receive information is different from a protocol type used by the second port to send information, the first port can still successfully obtain, through parsing, the indication information that is sent by the second port by using the PCS code block and that is used to indicate the protocol type supported by the second port, so that the first port successfully obtains the protocol type supported by the second port.

In a possible design, the obtaining, by the first device by using a first PCS code block, a protocol type currently used by the second port to send information includes: when a first preset PCS code block is received, determining, by the first device, that the protocol type currently used by the second port to send information is the flexible Ethernet protocol; or when a first preset PCS code block is not received, determining, by the first device, that the protocol type currently used by the second port to send information is the standard Ethernet protocol. There are a plurality of specific determining manners. For example, if it is determined that information received by the first port does not include the first preset PCS code block, or if it is found that information received by the first port includes a third preset PCS code block, it may be determined that the protocol type currently used by the second port to send information is the standard Ethernet protocol. In this way, the first port may conveniently and quickly determine the protocol type currently used by the second port to send information.

In a possible design, the obtaining, by a first device, a protocol type supported by a second port of a second device includes: receiving, by the first device through the first port based on the obtained protocol type currently used by the second port to send information, the indication information used to indicate the protocol type supported by the second port. In this way, a working state of the first port may be actively adapted to a working state of the peer end, that is, a protocol used by the first port to receive information is actively adapted to a protocol used by the second port to send information.

To improve solution flexibility, in a possible design, the indication information used to indicate the protocol type supported by the second port is carried in a control packet at a medium access control MAC layer; or the indication information used to indicate the protocol type supported by the second port is carried in a control packet at another layer higher than a MAC layer.

In a possible design, the obtaining, by a first device, a protocol type supported by a second port of a second device includes: when determining that the obtained protocol type currently used by the second port to send information is a non-preset protocol type, determining, by the first device, that the protocol type supported by the second port of the second device is the non-preset protocol type, where a preset protocol type includes the flexible Ethernet protocol, and the non-preset protocol type includes the standard Ethernet protocol; or a preset protocol type includes the standard Ethernet protocol, and the non-preset protocol type includes the flexible Ethernet protocol. In this way, the protocol type supported by the second port may be determined by using a simpler solution, and time overheads are reduced.

In a possible design, the obtaining, by a first device, a protocol type supported by a second port of a second device includes:

obtaining, by the first device by using the PCS code block, the protocol type supported by the second port.

In a possible design, the obtaining, by a first device, a protocol type supported by a second port of a second device includes at least one of the following content: when a second preset PCS code block is received, determining, by the first device, that the protocol type supported by the second port includes the flexible Ethernet protocol and the standard Ethernet protocol; when a second preset PCS code block is not received and the first preset PCS code block is received, determining, by the first device, that the protocol type supported by the second port is the flexible Ethernet protocol; or when neither a second preset PCS code block nor the first preset PCS code block is received, determining, by the first device, that the protocol type supported by the second port is the standard Ethernet protocol. In this way, the first port may determine, by using the first preset PCS code block and the second preset PCS code block, the protocol type supported by the second port. This is simple and fast, and can reduce time overheads.

In a possible design, the first preset PCS code block includes an OH frame header code block of the flexible Ethernet protocol.

In a possible design, to select a better target protocol type, in an optional implementation, the protocol type supported by the second port of the second device includes the flexible Ethernet protocol and the standard Ethernet protocol; the first device obtains first indication information; and the first device determines the target protocol type based on the first indication information and the protocol type supported by the first port of the first device. The first indication information is used to indicate a protocol type with a higher priority in the protocol type supported by the second port, and second indication information is used to indicate a priority level of the protocol type with a higher priority in the protocol type supported by the second port.

In a possible design, to select a better target protocol type, the protocol type supported by the second port of the second device includes the flexible Ethernet protocol and the standard Ethernet protocol; the first device obtains first indication information; and the first device determines the target protocol type based on the first indication information and a protocol type with a higher priority in the protocol type supported by the first port of the first device.

In a possible design, to select a better target protocol type, before the first device determines the target protocol type based on the protocol type supported by the second port of the second device and the protocol type supported by the second port of the first device, the method further includes: obtaining, by the first device, second indication information; and determining, by the first device, the target protocol type based on first indication information, the second indication information, a protocol type with a higher priority in the protocol type supported by the first port of the first device, and a priority level of the protocol type with a higher priority in the protocol type supported by the first port of the first device.

According to a second aspect, an embodiment of this application provides a communication method. In the method, a second device generates indication information used to indicate a protocol type supported by a second port of the second device, where the protocol type supported by the second port of the second device includes a flexible Ethernet protocol and/or a standard Ethernet protocol; and the second device sends the indication information used to indicate the protocol type supported by the second port.

A first device in this embodiment of this application may include one or more ports. A first port in this embodiment of this application is specifically a port that is of the first device and that can support two types of protocols. To be specific, one or more ports that are of the first device and that support two protocol types may be referred to as first ports. The second device may also include one or more ports, and the second port is a port that is of the second device and that has a link with the first port. The second port may support one protocol type, such as the standard Ethernet protocol or the flexible Ethernet protocol; or the second port may support two types of protocols. When the second port supports two protocol types, the second port may also perform a solution similar to a solution performed by the first port in this embodiment of this application. For specific content, refer to descriptions in subsequent embodiments.

In this embodiment of this application, the second device sends the indication information used to indicate the protocol type supported by the second port, so that a peer end can communicate with the second port based on a capability of the second port of the second device.

In a possible design, the method further includes: sending, by the second device by using a physical coding sublayer PCS code block, indication information used to indicate a protocol type currently used by the second port to send information. To be specific, the indication information used to indicate the protocol type supported by the second port is carried in the PCS code block. Therefore, when two ports transmit information to each other by using the PCS code block, PCS layer information can still be parsed even if protocol types used by the two ports are different. Based on this, in this embodiment of this application, the indication information used to indicate the protocol type supported by the second port is transmitted by using the PCS code block. Even if a protocol type used by the first port to receive information is different from a protocol type used by the second port to send information, the first port can still successfully obtain, through parsing, the indication information that is sent by the second port by using the PCS code block and that is used to indicate the protocol type supported by the second port, so that the first port successfully obtains the protocol type supported by the second port.

In a possible design, the sending, by the second device by using a physical coding sublayer PCS code block, indication information used to indicate a protocol type currently used by the second port to send information includes: sending, by the second device, a first preset PCS code block when the protocol type currently used by the second port to send information is the flexible Ethernet protocol. In this way, the first device may determine, by using the first preset PCS code block, the protocol type currently used by the second port to send information. This can reduce time overheads, and can lay a foundation for establishing a temporary channel subsequently.

In a possible design, to improve solution flexibility, the sending, by the second device, the indication information used to indicate the protocol type supported by the second port includes: sending, by the second device, information based on a preset protocol type when the second port supports the flexible Ethernet protocol and the standard Ethernet protocol, where if the preset protocol type is the flexible Ethernet protocol, the information includes the first preset PCS code block; or if the preset protocol type is the standard Ethernet protocol, the information does not include the first preset PCS code block.

In a possible design, the indication information used to indicate the protocol type supported by the second port of the second device is carried in a control packet at a medium access control MAC layer; or the indication information used to indicate the protocol type supported by the second port of the second device is carried in a control packet at another layer higher than a MAC layer. In a possible design, the indication information used to indicate the protocol type supported by the second port is carried in the PCS code block. In this way, solution flexibility can be improved.

In a possible design, the sending, by the second device, the indication information used to indicate the protocol type supported by the second port of the second device includes at least one of the following content: when the second port of the second device supports the flexible Ethernet protocol and the standard Ethernet protocol, sending information including a second preset PCS code block; when the second port of the second device supports the flexible Ethernet protocol, sending information that does not include a second preset PCS code block and includes the first preset PCS code block; or when the second port of the second device supports the standard Ethernet protocol, sending information including neither a second preset PCS code block nor the first preset PCS code block. In this way, the first port may determine, by using the first preset PCS code block and the second preset PCS code block, the protocol type supported by the second port. This is simple and fast, and can reduce time overheads.

In a possible design, the first preset PCS code block includes an OH frame header code block of the flexible Ethernet protocol.

In a possible design, to select a better target protocol type, the protocol type supported by the second port includes the flexible Ethernet protocol and the standard Ethernet protocol. The method further includes: sending, by the second device, first indication information; or sending, by the second device, first indication information and second indication information. The first indication information is used to indicate a protocol type with a higher priority in the protocol type supported by the second port, and the second indication information is used to indicate a priority level of the protocol type with a higher priority in the protocol type supported by the second port.

Corresponding to the communication method according to any one of the first aspect and the second aspect, this application further provides a communications device. The communications device may be any transmit end device or receive end device that transmits data in a wireless manner, for example, a communications chip, user equipment, or a network device (for example, a base station). In a communication process, a transmit end device and a receive end device are opposite to each other. In some communication processes, the communications device may serve as the first device, and has a function of a receive end. In some communication processes, the communications device may serve as the second device, and has a function of a transmit end. For example, two network devices transmit information to each other, and each network device may not only serve as the second device to receive information, but also serve as the first device to send information. A communication manner is not limited in this application.

Any one of the first device and the second device may be user equipment or a communications chip that can be used for user equipment, may be a network device, or may be a communications chip that can be used for a network device. The first port is a port that is of the first device and that supports two protocol types, and the second port is any port of the second device.

According to a third aspect, a communications device is provided, including a transceiver unit and a processing unit, to perform the method according to any possible implementation of the first aspect, or the communications device is configured to perform the method according to any possible implementation of the second aspect. The transceiver unit is configured to perform functions related to sending and receiving. Optionally, the transceiver unit includes a receiving unit and a sending unit. In a design, the communications device is a communications chip, the receiving unit may be an input circuit or port on the communications chip, and the sending unit may be an output circuit or port on the communications chip.

In another design, the sending unit may be a transmitter. In another design, the receiving unit may be a receiver.

Optionally, the communications device further includes modules configured to perform the communication method according to any possible implementation of the first aspect; or optionally, the communications device further includes modules configured to perform the communication method according to any possible implementation of the second aspect.

According to a fourth aspect, a communications device is provided, including a processor, a memory, and a transceiver. The memory is configured to store a computer program, and the processor is configured to invoke the computer program from the memory and run the computer program, so that the communications device performs the method according to any possible implementation of the first aspect, or the communications device is configured to perform the method according to any possible implementation of the second aspect.

Optionally, there is one or more processors, and there is one or more memories.

Optionally, the memory may be integrated with the processor, or the memory and the processor are disposed separately.

Optionally, the transceiver may include a transmitter (transmitter) and a receiver (receiver).

According to a fifth aspect, a system is provided, and the system includes the first device and the second device.

According to a sixth aspect, a communications device is provided, and a system includes the first device and the second device.

According to a seventh aspect, a computer program product is provided, and the computer program product includes a computer program (also referred to as code or an instruction). When the computer program runs, a computer performs the method according to any possible implementation of the first aspect, or a computer performs the method according to any possible implementation of the second aspect.

According to an eighth aspect, a computer readable medium is provided, and the computer readable medium stores a computer program (also referred to as code or an instruction). When the computer program runs on a computer, the computer performs the method according to any possible implementation of the first aspect, or the computer performs the method according to any possible implementation of the second aspect.

BRIEF DESCRIPTION OF DRAWINGS

FIG. 10 is a schematic diagram of a coded ordered set code block according to an embodiment of this application;

FIG. 11 is a schematic diagram of a capability ordered set of indication information indicating a protocol type supported by a port, and a schematic diagram of a status ordered set indicating a protocol type currently used by the port in a sending direction according to an embodiment of this application;

FIG. 12 is a schematic diagram of a capability ordered set of indication information indicating a protocol type supported by a port, and a schematic diagram of a status ordered set indicating a protocol type currently used by the port in a sending direction according to an embodiment of this application;

FIG. 13 is a schematic diagram of a capability ordered set of indication information indicating a protocol type supported by a port, and a schematic diagram of a status ordered set indicating a protocol type currently used by the port in a sending direction according to an embodiment of this application;

FIG. 16 is a schematic diagram of an LLDP packet according to an embodiment of this application;

DESCRIPTION OF EMBODIMENTS

Figure 1:
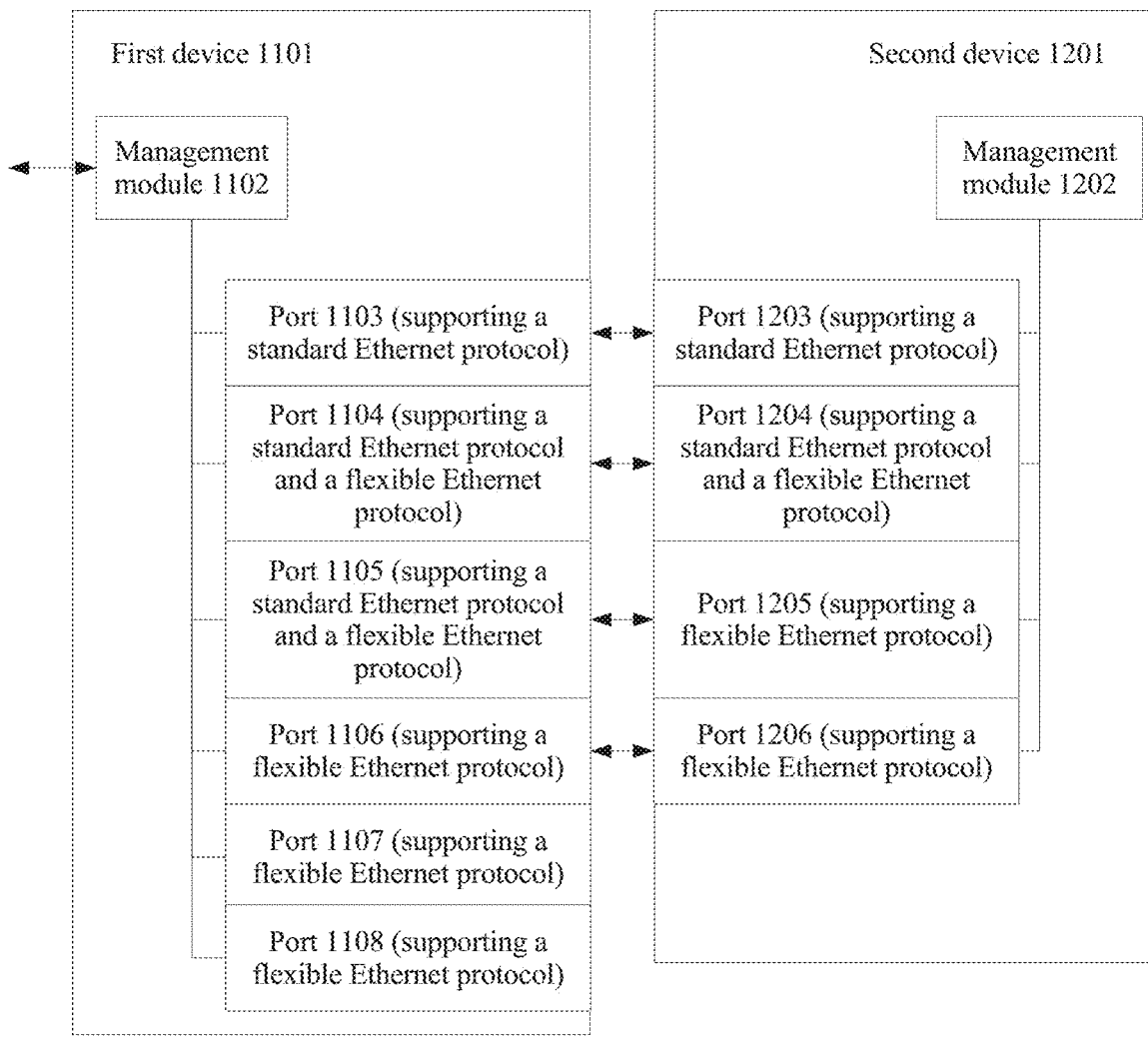
FIG. 1 is a schematic architectural diagram of a communications system to which an embodiment of this application is applied.

FIG. 1 is a schematic architectural diagram of a communications system to which an embodiment of this application is applied. As shown in FIG. 1, the communications system 1100 may include a first device 1101 and a second device 1201. Any one of the first device 1101 and the second device 1201 may include one or more ports. Any port of the device may support only a standard Ethernet protocol, may support only a flexible Ethernet protocol, or may support both a standard Ethernet protocol and a flexible Ethernet protocol. As shown in FIG. 1, in the first device 1101, a port 1103 supports the standard Ethernet protocol, a port 1104 and a port 1105 support both the standard Ethernet protocol and the flexible Ethernet protocol, and a port 1106, a port 1107, and a port 1108 support the flexible Ethernet protocol. Still as shown in FIG. 1, in the second device 1201, a port 1203 supports the standard Ethernet protocol, a port 1204 and a port 1205 support both the standard Ethernet protocol and the flexible Ethernet protocol, and a port 1206 supports the flexible Ethernet protocol. A port supporting both the standard Ethernet protocol and the flexible Ethernet protocol may also be referred to a port supporting a dual mode. A port supporting only the standard Ethernet protocol may be referred to as a port supporting a single mode. A port supporting only the flexible Ethernet protocol may also be referred to as a port supporting a single mode.

The ports of the first device and the second device in this embodiment of this application may also be referred to as Ethernet ports. The ports may be connected to each other, for example, in FIG. 1, the port 1103 of the first device 1101 is connected to the port 1203. The port 1107 and the port 1108 of the first device 1101 may be connected to another device, or may be temporarily empty. "Empty" may mean that the port is not connected to another device, or may mean that the port is connected to another device but a link is not enabled. Usually, one port may be connected to another port, that is, a transmission link is established. Optionally, one port may be connected to a plurality of ports, and a plurality of transmission links exist. This is not limited in this embodiment of this application. In this embodiment of this application, a transmission link constituted by two ports is used as an example for description. When a plurality of links exist, for two ports corresponding to each link, refer to the solution provided in this embodiment of this application.

As shown in FIG. 1, in this embodiment of this application, any one of the first device 1101 and the second device 1201 may include a management module, such as a management module 1102 in the first device 1101 and a management module 1202 in the second device 1201. The management module may obtain a protocol type supported by each of all ports of the device, and may also obtain a protocol type supported by a peer port connected to the port. For example, the management module may obtain a protocol supported by the port 1103, and may also obtain a protocol type supported by the peer port 1203 connected to the port 1103. Further, the management module may further receive information entered externally, and may further determine, based on the information entered externally, a protocol type used to send information and receive information by a port supporting two protocol types. Optionally, the management module subsequently may also configure, based on a protocol type supported by a port, a protocol type used by the port when the port sends information and receives information.

Figure 2:
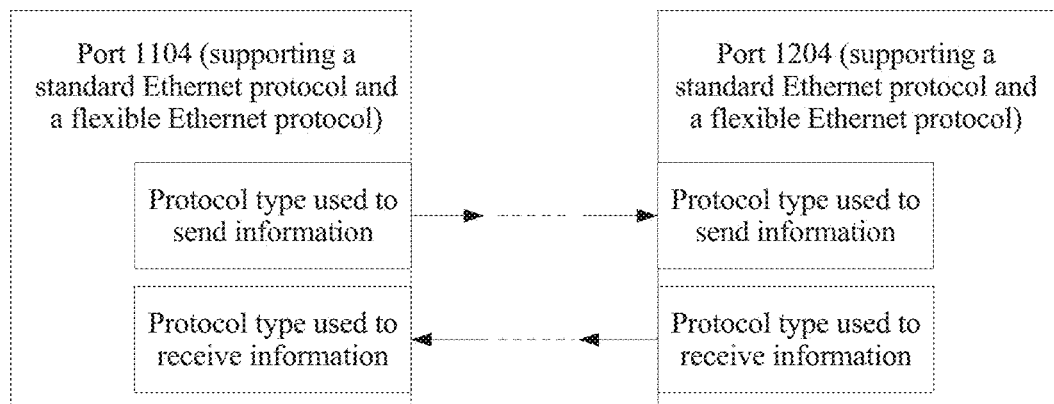
FIG. 2 is a schematic structural diagram of information transmission between ports that is applicable to an embodiment of this application.

In this embodiment of this application, information may be mutually transmitted between ports. FIG. 2 shows an example of a schematic structural diagram of information transmission between ports that is applicable to an embodiment of this application. As shown in FIG. 2, the port 1104 may both send information and receive information, and the port 1204 may both send information and receive information. When the port 1104 and the port 1204 are connected, the first device 1101 may send information to the port 1204 through the port 1104, and the second device 1201 may also send information to the port 1104 through the port 1204.

Further, as shown in FIG. 2, in this embodiment of this application, when a port supports two protocol types, a protocol type used by the port to send information may be different from or the same as a protocol type used by the port to receive information. For example, if the protocol type used by the port to send information is the standard Ethernet protocol, the port sends information according to the standard Ethernet protocol; and if the protocol type used by the port to receive information is the flexible Ethernet protocol, the port receives information according to the flexible Ethernet protocol. Specifically, when the port sends information according to the standard Ethernet protocol, the sent information complies with the standard Ethernet protocol, and a port that receives the information may parse the information according to the standard Ethernet protocol. Alternatively, when the port sends information according to the flexible Ethernet protocol, the sent information complies with the flexible Ethernet protocol, and a port that receives the information may parse the information according to the flexible Ethernet protocol. In addition, when receiving information according to the standard Ethernet protocol, the port parses the received information according to the standard Ethernet protocol. Alternatively, when receiving information according to the flexible Ethernet protocol, the port parses the received information according to the flexible Ethernet protocol.

In this embodiment of this application, the first device 1101 and the second device 1201 may communicate with each other. Any one of the first device and the second device may communicate with one or more core networks by using a radio access network (Radio Access Network, RAN for short). The device may be user equipment or a chip that can be disposed in user equipment. In this embodiment of this application, the first device 1101 and the second device 1201 may communicate with each other. Any one of the first device and the second device may be a network device or a chip disposed in a network device. The device includes but is not limited to a base station (for example, a NodeB (NodeB), an evolved NodeB eNodeB, or a network device (for example, a transmission point (transmission point, TP), a transmission and reception point (transmission reception point, TRP), a base station, or a small cell device) in a fifth generation (the fifth generation, 5G) communications system), a network device in a future communications system, or an access node, a wireless relay node, or a wireless backhaul node in a WiFi system.

Figures 3, 4:
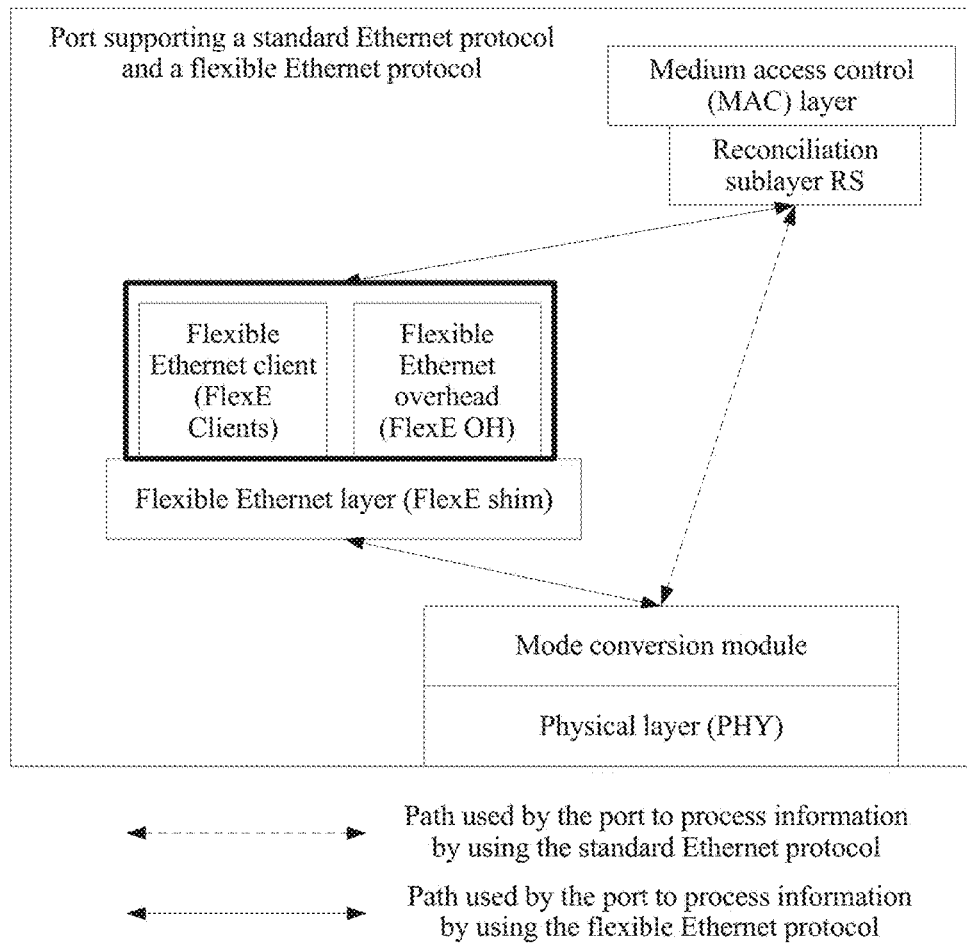
FIG. 3 is a schematic diagram of an internal structure of a port supporting a standard Ethernet protocol and a flexible Ethernet protocol according to an embodiment of this application.
FIG. 4 is a schematic structural diagram of a frame format of a standard Ethernet protocol according to an embodiment of this application.

FIG. 3 shows an example of a schematic diagram of an internal structure of a port supporting a standard Ethernet protocol and a flexible Ethernet protocol according to an embodiment of this application. The port may include a physical layer (Physical, PHY), a mode conversion module (which may be referred to as a "mode switch" in English), a flexible Ethernet layer (FlexE shim), a flexible Ethernet client (FlexE Clients), a flexible Ethernet overhead (FlexE Overhead, FlexE OH), a reconciliation sublayer (Reconciliation Sublayer, RS), and a medium access control (Medium Access Control, MAC) layer. If the port sends information according to the standard Ethernet protocol, a flow direction of the information may be sequentially MAC layer-RS-mode conversion module-physical layer. When the port receives information according to the flexible Ethernet protocol, a flow direction of the information may be sequentially MAC layer-RS-flexible Ethernet client or flexible Ethernet overhead-flexible Ethernet layer-mode conversion module-physical layer. If the port receives information according to the standard Ethernet protocol, a flow direction of the information may be sequentially physical layer-mode conversion module-RS-MAC layer. When the port receives information according to the flexible Ethernet protocol, a flow direction of the information may be sequentially physical layer-mode conversion module-flexible Ethernet layer-flexible Ethernet client or flexible Ethernet overhead-RS-MAC layer. The flexible Ethernet client and the flexible Ethernet overhead are two modes. For example, a flexible Ethernet client channel is used to carry a service packet, and a flexible Ethernet overhead channel is used to specifically carry a management packet.

As shown in FIG. 3, optionally, the mode conversion module is configured to implement conversion between two types of protocols. The mode conversion module may further identify some received information, for example, the mode conversion module may identify indication information used to indicate a protocol type supported by a second port of a second device, or may identify indication information used to indicate a protocol type currently used by a second port of a second device to send information, for example, the indication information is some special mark code blocks (FlexE OH code blocks or other customized feature code blocks).

In the standard Ethernet protocol, bandwidth of a port is not divided in terms of time division multiplexing, and a complete physical link may be multiplexed to collect statistics about service data packets, management protocol packets, and operation, administration and maintenance (Operations, Administration, and Maintenance, OAM) protocol packets. FIG. 4 shows an example of a schematic structural diagram of a frame format of a standard Ethernet protocol according to an embodiment of this application. As shown in FIG. 4, the frame format includes a destination address (Destination Address, DA), a source address (Source Address, SA), a type (Type), data (Data), and a frame check sequence (frame check sequence, FCS). A management protocol packet and an OAM protocol packet usually may be distinguished from the service data packet by using a special layer-2 MAC address, a packet type, and the like.

Figure 5:
FIG. 5 is a schematic structural diagram of a frame format of a flexible Ethernet protocol according to an embodiment of this application.

FIG. 5 shows an example of a schematic structural diagram of a frame format of a flexible Ethernet protocol according to an embodiment of this application. As shown in FIG. 5, a fixed frame format may be constructed based on the flexible Ethernet protocol for transmission through a physical port, and slot division is performed based on time division multiplexing (Time Division Multiplexing, TDM). A slot division granularity of a FlexE may be 66B, and correspondingly carries a 64B/66B code block. For a 100 GE PHY port, a data code block stream may include 20 64B/66B code blocks and correspond to 20 slots. Each slot has a bandwidth of 5G, and 5G is referred to as one slot (slot). In this embodiment of this application, 64B/66B may be understood as 64-bit bit blocks and 66-bit code blocks that are obtained by coding the 64-bit bit blocks.

As shown in FIG. 5, the flexible Ethernet may construct a time division multiplexing frame structure based on a 64B/66B code block. Data at each PHY in the FlexE is aligned by periodically inserting a FlexE overhead (Overhead, OH) code block. For example, one 66B overhead code block FlexE OH may be inserted every 1023×20 66B payload data code blocks. As shown in FIG. 5, 66B code blocks in eight rows (each row includes one OH code block+1023×20 data (Data)) constitute a protocol frame of the flexible Ethernet protocol, as shown in FIG. 5; and 32 protocol frames of the flexible Ethernet protocol constitute a multiframe of the flexible Ethernet protocol. In a possible implementation solution, in the first OH code block in the protocol frame of the flexible Ethernet protocol, a 0x4B field of bits 0 to 7 and a 0x5 field of bits 32 to 35 jointly constitute a frame header indication mark field of a FlexE frame overhead code block. In the FlexE OH, two management channels may be defined, and the management channel may be used to run a management communication link and an OAM communication link of a 1.2 Mb/s Ethernet protocol and a 1.8 Mb/s Ethernet protocol that are coded based on a 64B/66B code block sequence. Further, in this embodiment of this application, 64B/66B coding may be used in a scenario of a 100 GE physical layer.

Figure 6:
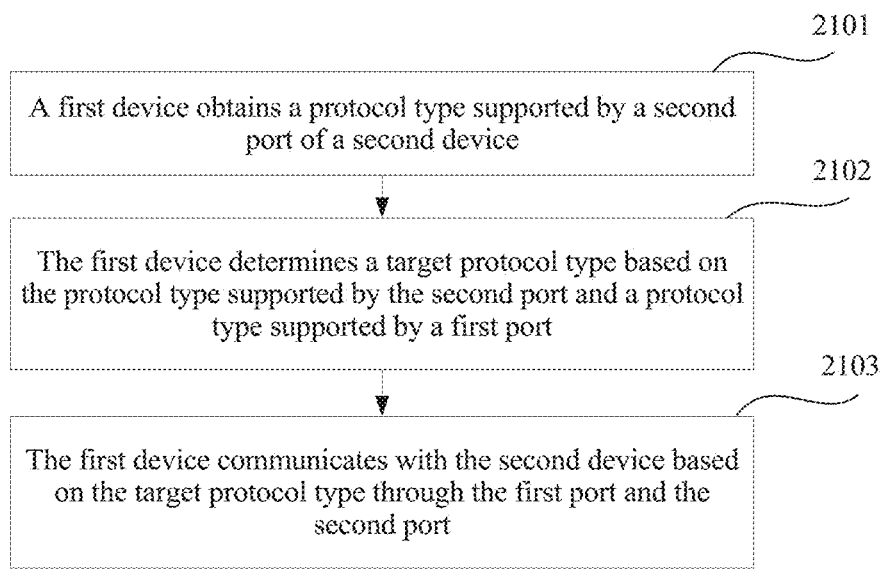
FIG. 6 is a schematic flowchart of a communication method according to an embodiment of this application.

Ports supporting different protocol types may have a same physical appearance attribute, but because of different management channels and mechanisms, a port supporting only a standard Ethernet protocol and a port supporting only a flexible Ethernet protocol do not have a capability of adapting to a state of the peer end and cannot communicate with each other. To be further compatible with a standard Ethernet, a port supporting the flexible Ethernet protocol and the standard Ethernet protocol may be configured. This embodiment of this application provides a solution, so that a port supporting both the flexible Ethernet protocol and the standard Ethernet protocol can obtain a protocol type supported by a peer port, and can further communicate with the peer port based on the protocol type supported by the port and the protocol type supported by the peer port. FIG. 6 shows an example of a schematic flowchart of a communication method according to an embodiment of this application. As shown in FIG. 6, the method includes the following steps.

Step 2101: A first device obtains a protocol type supported by a second port of a second device, where the protocol type supported by the second port of the second device includes a flexible Ethernet protocol and/or a standard Ethernet protocol, and a first port of the first device supports the flexible Ethernet protocol and the standard Ethernet protocol.

Step 2102: The first device determines a target protocol type based on the protocol type supported by the second port and a protocol type supported by the first port, where the target protocol type includes the flexible Ethernet protocol or the standard Ethernet protocol.

Step 2103: The first device communicates with the second device based on the target protocol type through the first port and the second port.

In this embodiment of this application, the port of the first device supports the flexible Ethernet protocol and the standard Ethernet protocol, and the protocol type supported by the port of the second device includes the flexible Ethernet protocol and/or the standard Ethernet protocol. The first device obtains the protocol type supported by the port of the second device, determines the target protocol type based on the protocol type supported by the port of the second device and the protocol type supported by the port of the first device, and communicates with the second device based on the target protocol type. The target protocol type includes the flexible Ethernet protocol or the standard Ethernet protocol. In this way, communication between another port and a port supporting both the flexible Ethernet protocol and the standard Ethernet protocol is implemented.

It may be learned by a person skilled in the art that if a new protocol type appears in the future, based on the solution provided in this embodiment of this application, the target protocol type may be further determined based on a protocol type supported by the local port and a protocol type supported by a peer port.

Figure 7:
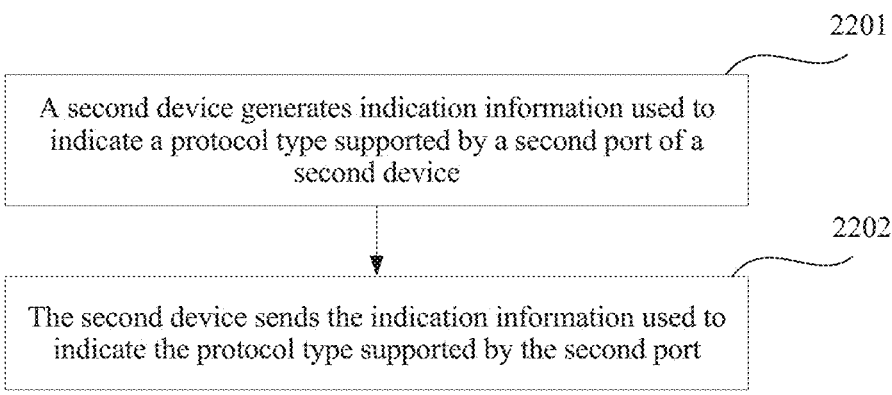
FIG. 7 is a schematic flowchart of a communication method according to an embodiment of this application.

In step 2101, the first device obtains, in a plurality of manners, the protocol type supported by the second port of the second device, for example, the protocol type is configured in a system in advance, or external management personnel enters the protocol type. FIG. 7 shows an example of a schematic flowchart of a communication method according to an embodiment of this application. As shown in FIG. 7, the method includes the following steps:

Step 2201: A second device generates indication information used to indicate a protocol type supported by a second port of the second device, where the protocol type supported by the second port of the second device includes a flexible Ethernet protocol and/or a standard Ethernet protocol.

Step 2202: The second device sends the indication information used to indicate the protocol type supported by the second port.

When a first device includes one or more ports, a first port is any port that is of the first device and that supports both the flexible Ethernet protocol and the standard Ethernet protocol. The second port is any port of the second device. The second port may support only the flexible Ethernet protocol, or may support only the standard Ethernet protocol, or may support both the flexible Ethernet protocol and the standard Ethernet protocol. Each port in this embodiment of this application has a sending capability and a receiving capability. When the port sends information, for a related solution, refer to a related solution of the second port in this embodiment of this application. When the port can support both the flexible Ethernet protocol and the standard Ethernet protocol, for a related solution in which the port receives information, refer to a related solution of the first port in this embodiment of this application.

To be specific, the solution provided in this embodiment of this application and performed by the first port may be applied to any port that can support both the flexible Ethernet protocol and the standard Ethernet protocol. The solution provided in this embodiment of this application and performed by the second port may be applied to any port. In other words, any port can perform the solution related to the second port in this embodiment of this application, and any port supporting both the flexible Ethernet protocol and the standard Ethernet protocol can perform the solution related to the first port in this embodiment of this application.

In an optional implementation, if the second port supports the flexible Ethernet protocol and the standard Ethernet protocol, the second port may also obtain a protocol type supported by the first port; determine a target protocol type based on the protocol type supported by the second port and the protocol type supported by the first port, where the target protocol type includes the flexible Ethernet protocol or the standard Ethernet protocol; and further communicate with the second device based on the target protocol type through the first port and the second port. Optionally, a related solution in which the second port obtains the protocol type supported by the first port is similar to a solution in which the first port obtains the protocol type supported by the second port. Details are not described herein again.

In another optional implementation, the first device generates indication information used to indicate a protocol type supported by the first port; and the first device sends the indication information used to indicate the protocol type supported by the first port. Optionally, a related solution in which the first port sends the indication information used to indicate the protocol type supported by the first port is similar to a solution in which the second port sends the indication information used to indicate the protocol type supported by the second port. Details are not described herein again.

In an optional implementation, after the first device determines a target protocol type, the first device sends information to the second port of the second device based on the target protocol type through the first port, so that the second port can successfully parse the information sent from the first port. In another optional implementation, after the first device determines a target protocol type, the first device receives, based on the target protocol type through the first port, information sent from the second port of the second device, so that the first port can successfully parse the information sent from the second port. In a third optional implementation solution, the first device sends information to the second port of the second device based on a target protocol type through the first port, and receives, based on the target protocol type through the first port, information sent from the second port of the second device, so that a protocol type used by the first port to send information is consistent with a protocol type used by the first port to receive information. Therefore, the first port better communicates with the second port, and the first port and the second port are also easily managed.

Further, in this embodiment of this application, before the first device determines the target protocol type, the method further includes: The first device obtains, by using a physical coding sublayer (Physical Coding Sublayer, PCS) code block, a protocol type currently used by the second port to send information. The PCS code block is a general term, and has no specified meaning. Specifically, the first device obtains, by using related information at a PCS layer, the protocol type currently used by the second port to send information. The PCS code block may be data information, or may be error information, link information, or the like. Because the PCS layer is a relatively low layer, time overheads can be reduced in a manner of obtaining information by using PCS layer signaling. In an optional implementation, the second device sends, by using a PCS code block, indication information used to indicate a protocol type currently used by the second port to send information. For example, the second device adds, to the PCS code block, the indication information used to indicate the protocol type currently used by the second port to send information. Because the first device obtains the protocol type currently used by the second port to send information, the first device may adaptively adjust a protocol type currently used by the first device to receive information, thereby laying a foundation for successfully parsing higher layer signaling subsequently. Further, in a possible implementation, the standard Ethernet protocol and the flexible Ethernet protocol are completely the same in terms of a physical architecture at a layer lower than the PCS layer, and both are 64B/66B code block streams on a data plane. Therefore, when two ports transmit information to each other by using the PCS code block, PCS layer information can still be parsed even if protocol types used by the two ports are different. Based on this, in this embodiment of this application, information is transmitted by using the PCS code block, so that a port using the flexible Ethernet protocol can perform PCS layer parsing on received information sent by using the standard Ethernet protocol, and a port using the standard Ethernet protocol can perform PCS layer parsing on received information sent by using the flexible Ethernet protocol. Therefore, the two ports supporting different protocols communicate with each other.

In an optional implementation solution provided in this embodiment of this application, the sending, by the second device by using a physical coding sublayer PCS code block, indication information used to indicate a protocol type currently used by the second port to send information includes: sending, by the second device, a first preset PCS code block when the protocol type currently used by the second port to send information is the flexible Ethernet protocol. Further, optionally, when the protocol type currently used by the second port to send information is the standard Ethernet protocol, the second device may not send a first preset PCS code block, or may send other information such as a third preset PCS code block used to indicate the standard Ethernet protocol. Alternatively, the second device sends a third preset PCS code block when the protocol type currently used by the second port to send information is the standard Ethernet protocol. In this way, the first port may determine, by determining whether the first preset PCS code block is received, the protocol type currently used by the second port to send information. This reduces time overheads and is also simple and fast. Optionally, a reserved bit in a code block in the prior art may be multiplexed for the first preset PCS code block, or some code blocks may be newly defined.

In another corresponding optional implementation, the obtaining, by the first device by using a first PCS code block, a protocol type currently used by the second port to send information includes: when a first preset PCS code block is received, determining, by the first device, that the protocol type currently used by the second port to send information is the flexible Ethernet protocol; or when a first preset PCS code block is not received, determining, by the first device, that the protocol type currently used by the second port to send information is the standard Ethernet protocol. There are a plurality of specific determining manners. For example, if it is determined that information received by the first port does not include the first preset PCS code block, or if it is found that information received by the first port includes a third preset PCS code block, it may be determined that the protocol type currently used by the second port to send information is the standard Ethernet protocol. In this way, the first port may conveniently and quickly determine the protocol type currently used by the second port to send information.

Further, in this embodiment of this application, optionally, the protocol type supported by the second port includes the flexible Ethernet protocol and the standard Ethernet protocol, and the method further includes: sending, by the second device, first indication information; or sending, by the second device, first indication information and second indication information. The first indication information is used to indicate a protocol type with a higher priority in the protocol type supported by the second port, and the second indication information is used to indicate a priority level of the protocol type with a higher priority in the protocol type supported by the second port. In an optional implementation, the protocol type supported by the second port of the second device includes the flexible Ethernet protocol and the standard Ethernet protocol; the first device obtains first indication information; and the first device determines the target protocol type based on the first indication information and the protocol type supported by the first port of the first device.

For example, the protocol type with a higher priority in the protocol type supported by the second port is a flexible Ethernet protocol type. In this case, the flexible Ethernet protocol may be selected as the target protocol type of the first port. Further, optionally, after obtaining the protocol type supported by the first port, the second port determines, based on the protocol types supported by the first port and the second port and the protocol type with a higher priority in the protocol type supported by the second port, that the target protocol type of the second port is also the flexible Ethernet protocol. Therefore, it may be learned that the first port and the second port determine a same target protocol type, so that the first port and the second port may communicate with each other based on the target protocol type.

In an optional implementation, the protocol type supported by the second port of the second device includes the flexible Ethernet protocol and the standard Ethernet protocol; the first device obtains first indication information; and the first device determines the target protocol type based on the first indication information and a protocol type with a higher priority in the protocol type supported by the first port of the first device.

For example, the protocol type with a higher priority in the protocol type supported by the first port is a flexible Ethernet protocol type, and a protocol type with a higher priority in the protocol type supported by the second port is a flexible Ethernet protocol type. It may be learned that the first port and the second port support a same protocol type with a higher priority. Therefore, the target protocol type selected by the first port is the flexible Ethernet protocol. Further, optionally, after the second port obtains the protocol type supported by the first port, the correspondingly determined target protocol type of the second port is also the flexible Ethernet protocol. Therefore, it may be learned that the first port and the second port determine a same target protocol type, so that the first port and the second port may communicate with each other based on the target protocol type.

For another example, the protocol type with a higher priority in the protocol type supported by the first port is a flexible Ethernet protocol type, and a protocol type with a higher priority in the protocol type supported by the second port is a standard Ethernet protocol type. It may be learned that the first port and the second port support different protocol types with a higher priority. In this case, the target protocol type may be selected according to some preset rules. For example, a preset rule may be selecting the flexible Ethernet protocol when the first port and the second port support different protocol types with a higher priority.

In a third optional implementation, before the first device determines the target protocol type based on the protocol type supported by the second port of the second device and the protocol type supported by the second port of the first device, the method further includes: obtaining, by the first device, second indication information; and determining, by the first device, the target protocol type based on first indication information, the second indication information, a protocol type with a higher priority in the protocol type supported by the first port of the first device, and a priority level of the protocol type with a higher priority in the protocol type supported by the first port of the first device. A priority level in this embodiment of this application is used to indicate a priority degree of a protocol type. For example, a level 0 to a level 3 may be set, the level 0 indicates a lowest priority degree, and the level 3 indicates a highest priority degree.

For example, the protocol type with a higher priority in the protocol type supported by the first port is a flexible Ethernet protocol type, and the priority level of the protocol type with a higher priority in the protocol type supported by the first port is the level 3; and a protocol type with a higher priority in the protocol type supported by the second port is a standard Ethernet protocol type, and a priority level of the protocol type with a higher priority in the protocol type supported by the second port is the level 3. It may be learned that the first port and the second port support different protocol types with a higher priority, and the protocol types with a higher priority in the protocol types that are supported by the first port and the second port have a same priority level. In this case, the target protocol type may be determined according to some preset rules. For example, a preset rule may be selecting the flexible Ethernet protocol when the first port and the second port support different protocol types with a higher priority, and the protocol types with a higher priority in the protocol types that are supported by the first port and the second port have a same priority level.

For another example, the protocol type with a higher priority in the protocol type supported by the first port is a flexible Ethernet protocol type, and the priority level of the protocol type with a higher priority in the protocol type supported by the first port is the level 3; and a protocol type with a higher priority in the protocol type supported by the second port is a standard Ethernet protocol type, and a priority level of the protocol type with a higher priority in the protocol type supported by the second port is a level 2. It may be learned that the first port and the second port support different protocol types with a higher priority, and the priority level of the protocol type with a higher priority in the protocol type supported by the first port is higher. Therefore, the target protocol type determined by the first port is the flexible Ethernet protocol. Further, optionally, after the second port obtains the protocol type supported by the first port, the target protocol type, of the second port, that is determined based on priority levels supported by the first port and the second port is also the flexible Ethernet protocol. Therefore, it may be learned that the first port and the second port determine a same target protocol type, so that the first port and the second port may communicate with each other based on the target protocol type.

Based on the foregoing content, this embodiment of this application provides an optional implementation. The obtaining, by a first device, a protocol type supported by a second port of a second device includes: obtaining, by the first device by using a second PCS code block, the protocol type supported by the second port. To be specific, the indication information used to indicate the protocol type supported by the second port is carried in the PCS code block. Therefore, when two ports transmit information to each other by using the PCS code block, PCS layer information can still be parsed even if protocol types used by the two ports are different. Based on this, in this embodiment of this application, the indication information used to indicate the protocol type supported by the second port is transmitted by using the PCS code block. Even if a protocol type used by the first port to receive information is different from a protocol type used by the second port to send information, the first port can still successfully obtain, through parsing, the indication information that is sent by the second port by using the PCS code block and that is used to indicate the protocol type supported by the second port, so that the first port successfully obtains the protocol type supported by the second port.

Further, in an optional implementation, specific characters are set in fixed fields in some PCS code blocks, to indicate the protocol type supported by the second port. For example, if the field is 1, it indicates that the protocol type supported by the second port includes the flexible Ethernet protocol; if the field is 0, it indicates that the protocol type supported by the second port includes the flexible Ethernet protocol and the standard Ethernet protocol; or if the field is empty, it indicates that the protocol type supported by the second port includes the standard Ethernet protocol.

This embodiment of this application provides an optional implementation solution to reduce time overheads. The sending, by the second device, the indication information used to indicate the protocol type supported by the second port of the second device includes at least one of the following content: when the second port of the second device supports the flexible Ethernet protocol and the standard Ethernet protocol, sending information including the second preset PCS code block; when the second port of the second device supports the flexible Ethernet protocol, sending information that does not include the second preset PCS code block and includes the first preset PCS code block; or when the second port of the second device supports the standard Ethernet protocol, sending information including neither the second preset PCS code block nor the first preset PCS code block. Correspondingly, in an optional implementation, the obtaining, by a first device, a protocol type supported by a second port of a second device includes at least one of the following content: when the second preset PCS code block is received, determining, by the first device, that the protocol type supported by the second port includes the flexible Ethernet protocol and the standard Ethernet protocol; when the second preset PCS code block is not received and the first preset PCS code block is received, determining, by the first device, that the protocol type supported by the second port is the flexible Ethernet protocol; or when neither the second preset PCS code block nor the first preset PCS code block is received, determining, by the first device, that the protocol type supported by the second port is the standard Ethernet protocol. In this way, the first port may determine, by using the first preset PCS code block and the second preset PCS code block, the protocol type supported by the second port. This is simple and fast, and can reduce time overheads.

In another optional implementation solution, the sending, by the second device, the indication information used to indicate the protocol type supported by the second port of the second device includes at least one of the following content: when the second port of the second device supports the flexible Ethernet protocol and the standard Ethernet protocol, sending information including the second preset PCS code block; when the second port of the second device supports the flexible Ethernet protocol, sending information including the first preset PCS code block; or when the second port of the second device supports the standard Ethernet protocol, sending information including neither the second preset PCS code block nor the first preset PCS code block, where for example, information including the third preset PCS code block may be sent. Correspondingly, in an optional implementation, the obtaining, by a first device, a protocol type supported by a second port of a second device includes at least one of the following content: when the second preset PCS code block is received, determining, by the first device, that the protocol type supported by the second port includes the flexible Ethernet protocol and the standard Ethernet protocol; when the first preset PCS code block is received, determining, by the first device, that the protocol type supported by the second port is the flexible Ethernet protocol; or when neither the second preset PCS code block nor the first preset PCS code block is received, determining, by the first device, that the protocol type supported by the second port is the standard Ethernet protocol. In this way, the first port may determine, by using the first preset PCS code block and the second preset PCS code block, the protocol type supported by the second port. This is simple and fast, and can reduce time overheads.

Figure 8:
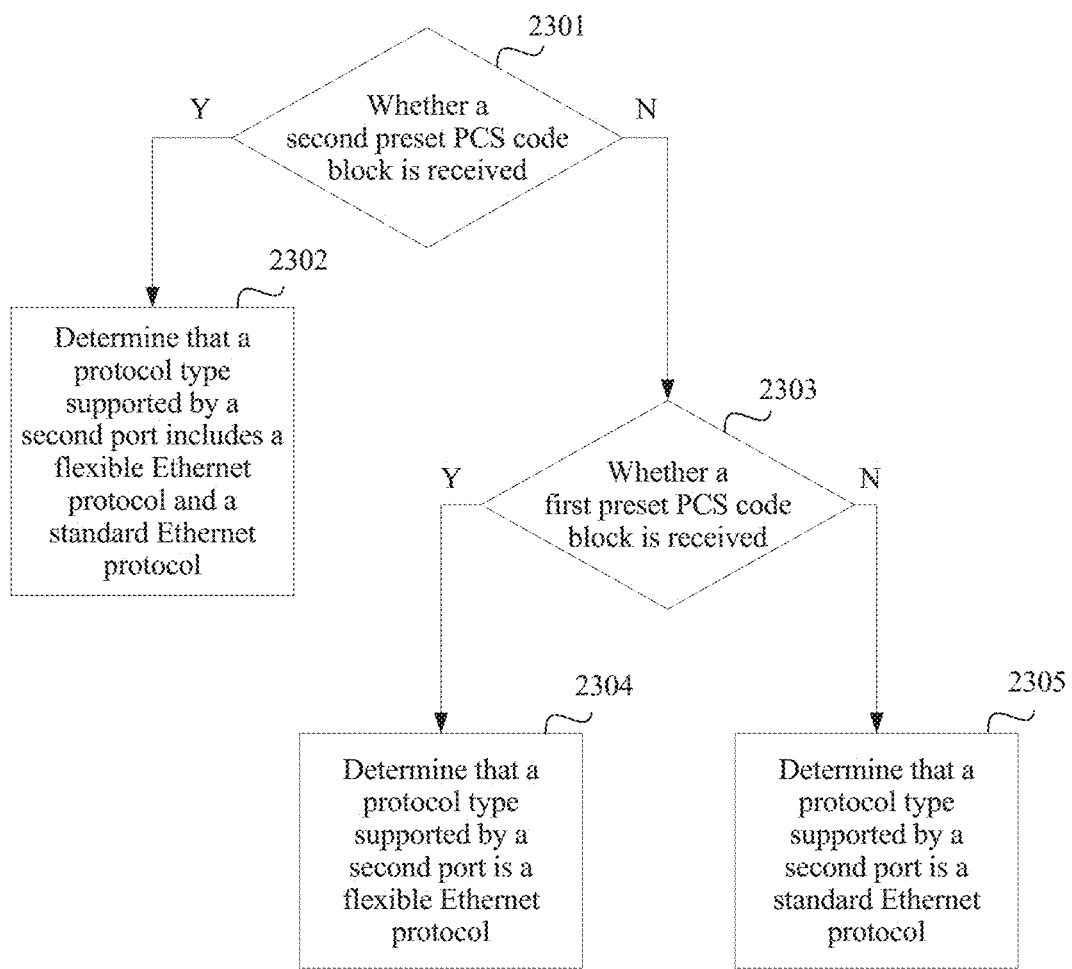
FIG. 8 is a schematic diagram of a communication method according to an embodiment of this application.

FIG. 8 shows an example of a schematic diagram of a communication method according to an embodiment of this application. As shown in FIG. 8, the method includes the following steps:

Step 2301: Determine whether a first port receives a second preset PCS code block; and perform step 2302 if the first port receives the second preset PCS code block; or perform step 2303 if the first port does not receive the second preset PCS code block.

Step 2302: Determine that a protocol type supported by a second port includes a flexible Ethernet protocol and a standard Ethernet protocol.

Step 2303: Determine whether the first port receives a first preset PCS code block; and perform step 2304 if the first port receives the first preset PCS code block; or perform step 2305 if the first port does not receive the first preset PCS code block.

Step 2304: Determine that the protocol type supported by the second port is a flexible Ethernet protocol.

Step 2305: Determine that the protocol type supported by the second port is a standard Ethernet protocol.

In the foregoing embodiment, the first preset PCS code block may include an OH frame header code block of the flexible Ethernet protocol. To be specific, the first preset PCS code block may be the overhead (OH) frame header code block of the flexible Ethernet protocol in FIG. 5, and the overhead (OH) frame header code block of the flexible Ethernet protocol may also be described as a FlexE OH 0x4B+0x5 code block. For other corresponding descriptions, refer to the foregoing content. For another example, the first preset PCS code block may also be in another form, for example, a field and a specific character are preset. If the character is received in the field, it is determined that the first preset PCS code block is received; or if the character is not received in the field, it is determined that the first preset PCS code block is not received.

In an optional implementation, the second preset PCS code block may be newly defined. To minimize modifications to the prior art, this embodiment of this application provides an implementation solution of the second preset PCS code block. The second preset PCS code block is a newly defined ordered set (ordered set) code block. The ordered set code block usually may meet content of "the ordered set code block is used to extend a capability of sending information about a control status and a link status, and the link status includes a remote fault state and a local fault state". In English, corresponding descriptions are content described in "ordered sets are used to extend the ability to send control and status information over the link such as remote fault and local fault status". The ordered set code block may also be referred to as an interface mode ordered set. An English description of the interface mode ordered set may be written as "interface mode ordered set". To be specific, the second preset PCS code block may be an ordered set code block. The ordered set code block is redefined in this embodiment of this application. In this embodiment of this application, the ordered set code block representing the second preset PCS code block may be referred to as a newly defined ordered set code block. The newly defined ordered set code block is based on 64B/66B coding. The first port may identify the first PCS code block and the second PCS code block, for example, identify the first PCS code block and the second PCS code block by using the mode conversion module in FIG. 3. The mode conversion module in FIG. 3 may be disposed at a physical layer.

Figure 9:
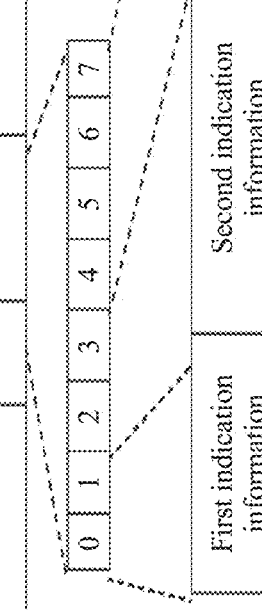
FIG. 9 is a schematic structural diagram of an ordered set code block according to an embodiment of this application.

FIG. 9 shows an example of a schematic structural diagram of an ordered set code block according to an embodiment of this application. As shown in FIG. 9, a last row is a newly defined ordered set code block, that is, the last row is a second preset PCS code block, and a first port may identify the newly defined ordered set code block. Further, optionally, the foregoing first indication information and/or second indication information may be carried in the ordered set code block. For example, the first two bits of a byte in a lane 2 in the last row identify the first indication information, that is, identity a protocol type with a higher priority, which may be referred to as a "prior mode" in English. For example, if the two bits are 10, it indicates that a protocol type with a higher priority and supported by a second port is a flexible Ethernet protocol; or if the two bits are 01, it indicates that a protocol type with a higher priority and supported by a second port is a standard Ethernet protocol. Two bits following the first two bits may identify the second indication information, which may be referred to as a "priority" in English. Further, optionally, to extend a future application scenario of this embodiment of this application, the last four bits may be used as reserved bits.

Further, the ordered set code block may be a code block including a control character and a data character, and may be used to send control information and status information, such as "reserved (reserved)", "local fault (local Fault)", and "remote fault (remote Fault)" in a last lane (Description) in the first three rows in the IEEE 802.3 standard supporting 40 Gb/s and 100 Gb/s in FIG. 9. In addition, the newly defined ordered set code block (the last row in FIG. 9) in this embodiment of this application may be used to carry indication information used to indicate a protocol type supported by the second port. In the newly defined ordered set code block (the last row in FIG. 9), a sequence in a lane 0 may be represented as a control code of 0x9C, and a value of the lane 2 may be determined by a prior mode and a priority. A lane 3 may be set to 0x03, and is a main identifier byte of an ordered set. To be specific, the first port may identify the second preset PCS code block by identifying the lane 3. A last lane in the last row in FIG. 9 may be an interface mode.

FIG. 10 shows an example of a schematic diagram of a coded ordered set code block according to an embodiment of this application. A link between a first port and a second port is enabled. When a protocol type supported by the second port includes a standard Ethernet protocol and a flexible Ethernet protocol, the second port sends a newly defined ordered set code block (a last row shown in FIG. 9), and a PCS layer of the second port codes the newly defined ordered set code block into a form of a second row in FIG. 10, to notify the peer end of the protocol type supported by the second port. In a possible coding manner, the sequence in the lane 0 in the last row in FIG. 9 is coded into a block type field 0x4B (bits 02 to 09 in the second row in FIG. 10);

0x00 in the lane 1 is coded into D1; 0x?? in the lane 2 is coded into 0x??; 0x03 in the lane 3 is coded into 0x03; and four 0x00 bytes in lanes 4 to 7 are coded into 0x5 and 0x000_0000 that are of 34 to 65 bits. A third row in FIG. 10 may represent a FlexE frame header code block.

In implementations provided in FIG. 8 to FIG. 10, optionally, a first device obtains, by using a first physical coding sublayer PCS code block, a protocol type currently used by the second port to send information. Optionally, the indication information used to indicate the protocol type supported by the second port may also indicate the protocol type currently used by the second port to send information. For example, when the second preset PCS code block is not received and the first preset PCS code block is received, the first device not only can determine that the protocol type supported by the second port is the flexible Ethernet protocol, but also can determine that the protocol type currently used by the second port to send information is the flexible Ethernet protocol. For another example, when neither the first preset PCS code block nor the second preset PCS code block is received, the first device not only can determine that the protocol type supported by the second port is the standard Ethernet protocol, but also can determine that the protocol type currently used by the second port to send information is the standard Ethernet protocol. For another example, when the first preset PCS code block is not received and the second preset PCS code block is received, the first device not only can determine that the protocol type supported by the second port is the flexible Ethernet protocol and the standard Ethernet protocol, but also can determine the protocol type currently used by the second port to send information. For example, it is preset that when a link is enabled, a port supporting the flexible Ethernet protocol and the standard Ethernet protocol uses, by default, the flexible Ethernet protocol to send information. In this case, if the first preset PCS code block is not received and the second preset PCS code block is received, the first device determines that the protocol type currently used by the second port to send information is a flexible protocol type. For another example, if the second preset PCS code block carries the first indication information, when the first preset PCS code block is not received and the second preset PCS code block is received, the first device determines that the protocol type currently used by the second port to send information is a protocol type with a higher priority and indicated by the first indication information.

This embodiment of this application provides another optional implementation. A sending ordered set (namely, an ordered set code block) in a sending direction of a transmitter of a port is based on an ordered set extended in this application. In one aspect, the ordered set is used to notify a protocol type supported by the port, including whether the port can support the flexible Ethernet protocol and/or the standard Ethernet protocol, specifically, whether the port supports a flexible Ethernet protocol (aware mode) capability, a flexible Ethernet protocol (terminated mode) capability, and a standard Ethernet protocol capability. The flexible Ethernet protocol (aware mode) capability may be expressed as "FlexE Mode (aware) Capable" in English, the flexible Ethernet protocol (terminated mode) capability may be expressed as "FlexE Mode (terminated) Capable" in English, and the standard Ethernet protocol (full-bandwidth MAC) capability may be expressed as "StdE Mode (Full BW MAC) Capable" in English. In another aspect, the ordered set is also used to notify a protocol type currently used by the port in the sending direction (transmitter direction). The ordered set may include a capability ordered set and a status ordered set. The capability ordered set is indication information used to indicate the protocol type supported by the port, and the status ordered set is indication information used to indicate the protocol type currently used by the port in the sending direction. FIG. 11, FIG. 12, and FIG. 13 show examples of schematic diagrams of a capability ordered set of indication information indicating a protocol type supported by a port, and schematic diagrams of a status ordered set indicating a protocol type currently used by the port in a sending direction according to an embodiment of this application. As shown in FIG. 11, FIG. 12, and FIG. 13:

When a capability ordered set sent by the second port is that FlexE Mode (aware)==0, FlexE Mode (terminated)==0, and StdE Mode (Full BW MAC)==1, it indicates that the protocol type supported by the second port includes the standard Ethernet protocol, and further indicates that the second port can work in the standard Ethernet protocol (full-bandwidth MAC).

When a capability ordered set sent by the second port is that FlexE Mode (aware)==1, FlexE Mode (terminated)==0, and StdE Mode (Full BW MAC)==0, it indicates that the protocol type supported by the second port includes the flexible Ethernet protocol. Specifically, the second port can work in the flexible Ethernet protocol (aware mode) (that is, an aware FlexE can process some overheads but do not extract a customer signal).

When a capability ordered set sent by the second port is that FlexE Mode (aware)==1, FlexE Mode (terminated)==1, and StdE Mode (Full BW MAC)==0, it indicates that the protocol type supported by the second port includes the flexible Ethernet protocol. Specifically, the second port can work in the flexible Ethernet protocol (terminated mode) (that is, a terminated FlexE processes and terminates all overheads, and extracts a customer signal).

When a capability ordered set sent by the second port is that FlexE Mode (aware)==1, FlexE Mode (terminated)==1, and StdE Mode (Full BW MAC)==1, it indicates that the protocol type supported by the second port includes the flexible Ethernet protocol and the standard Ethernet protocol. Specifically, the second port can work in the flexible Ethernet protocol (terminated mode) (that is, a terminated FlexE processes and terminates all overheads, and extracts a customer signal). In addition, the terminated FlexE can process and exchange customer signals in a packet processing manner in a conventional Ethernet.

Optionally, specifically, for the flexible Ethernet protocol, the port may further define and notify a flexible Ethernet group capability token (FlexE Group Capability key). In this way, ports having a same capability token may construct a FLexE group group; and ports having different capability tokens cannot construct a FLexE group. Optionally, the status ordered set may further be defined to notify the protocol type currently used by the port in the sending direction. A meaning of this definition is similar to that of a capability set, and the status ordered set is used to indicate a current working state. Details are not described again.

Figure 14:
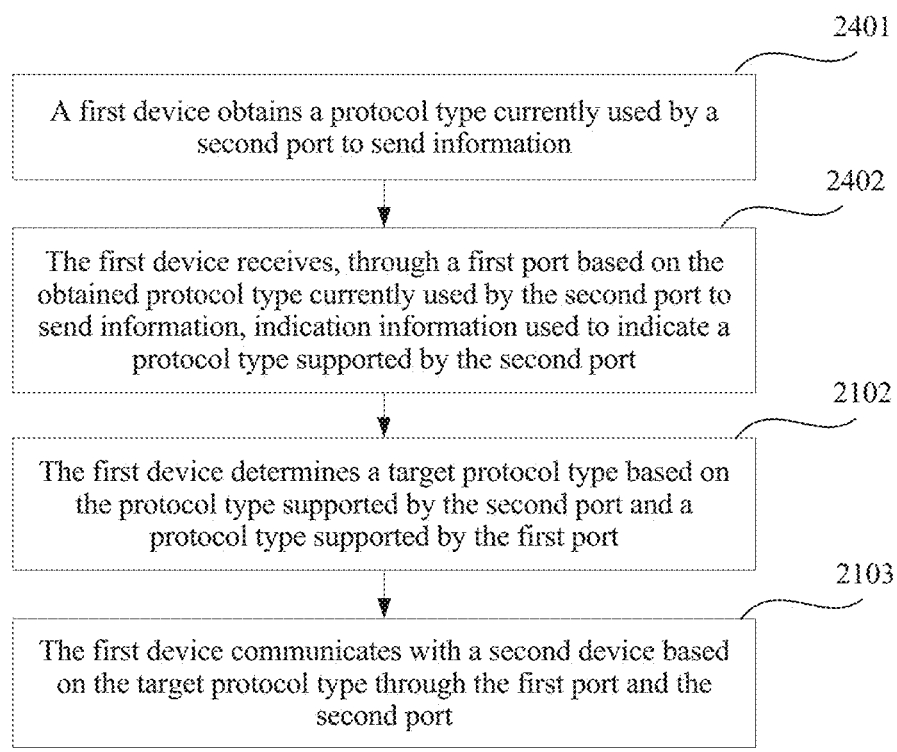
FIG. 14 is a schematic flowchart of another communication method according to an embodiment of this application.

FIG. 14 shows an example of a schematic flowchart of another communication method according to an embodiment of this application. As shown in FIG. 14, the method includes the following steps.

Step 2401: A first device obtains a protocol type currently used by a second port to send information. For a specific manner of obtaining the protocol type currently used by the second port to send information, refer to the foregoing content. Details are not described herein again.

Step 2402: The first device receives, through a first port based on the obtained protocol type currently used by the second port to send information, indication information used to indicate a protocol type supported by the second port. For example, if the protocol type currently used by the second port to send information is a flexible Ethernet protocol, the first device receives, by using the flexible Ethernet protocol, the indication information used to indicate the protocol type supported by the second port; or if the protocol type currently used by the second port to send information is a standard Ethernet protocol, the first device receives, by using the standard Ethernet protocol, the indication information used to indicate the protocol type supported by the second port.

Optionally, the indication information used to indicate the protocol type supported by the second port may be information carried in an LLDP packet. In an optional implementation, the first port receives the indication information used to indicate the protocol type supported by the second port, and may directly determine, based on the indication information, the protocol type supported by the second port. In another optional implementation, that the first port determines, based on the indication information used to indicate the protocol type supported by the second port, the protocol type supported by the second port includes: The first port determines whether the preset packet is received; and if the preset packet is received, determines, based on information in the preset packet, the protocol type supported by the second port; or if a preset packet is not received, directly determines that the protocol type supported by the second port is a standard Ethernet protocol type. The preset packet may be an LLDP packet.

Step 2102: The first device determines a target protocol type based on the protocol type supported by the second port and a protocol type supported by the first port, where the target protocol type includes the flexible Ethernet protocol or the standard Ethernet protocol.

Step 2103: The first device communicates with a second device based on the target protocol type through the first port and the second port.

In the solution shown in FIG. 14, a working state of the first port may be actively adapted to a working state of the peer end, that is, a protocol used by the first port to receive information is actively adapted to a protocol used by the second port to send information. Therefore, a temporary session channel is established in step 2402, to provide a basis for a next step of receiving the indication information used to indicate the protocol type supported by the second port of the second device. In addition, the temporary channel is further created in step 2101, that is, a protocol type used by the first port to receive information is the same as the protocol type currently used by the second port to send information. Therefore, the indication information used to indicate the protocol type supported by the second port is carried in a control packet at a medium access control MAC layer, or the indication information used to indicate the protocol type supported by the second port is carried in a control packet at another layer higher than a MAC layer. The first port can correctly obtain, through parsing, the indication information used to indicate the protocol type supported by the second port. To be specific, in this embodiment of this application, based on the created temporary channel, the indication information used to indicate the protocol type supported by the second port not only may be directly carried in the control packet at the MAC layer, but also may be nested in a packet, carried in the MAC control packet, of a higher layer protocol such as an internet protocol (Internet Protocol, IP), a transfer control protocol (Transfer Control Protocol, TCP), or another protocol. This is not specifically limited. In an optional implementation, when the indication information used to indicate the protocol type supported by the second port is directly carried in the MAC control packet, the indication information may be an extended type-length-value (Type-length-value, TLV) of a link layer discovery protocol (Link Layer Discovery Protocol, LLDP) capability (Capability) in this embodiment of this application. When the indication information used to indicate the protocol type supported by the second port is carried in any higher layer control protocol, the indication information is encapsulated layer by layer in lower layers and is finally encapsulated in the control packet at the MAC layer.

In an optional implementation, if the first port does not detect a FlexE OH frame header, the first port may determine that the protocol type currently used by the second port to send information is the standard Ethernet protocol. In this case, the first port adjusts a protocol used by the first port to receive information to the standard Ethernet protocol, that is, the first port receives information according to the standard Ethernet protocol. Further, the first port receives information sent by the second port. The information indicates that a protocol supported by the second port is the standard Ethernet protocol, and the information may be a packet of the standard Ethernet protocol (which includes a slow protocol such as the LLDP, that is, the second port does not send the extended LLDP TLV in this embodiment of this application, or the second port does not notify the first port of the unsupported flexible Ethernet protocol). Therefore, the first port determines that the protocol supported by the second port is the standard Ethernet protocol, that is, the second port is in a single mode. Further, the standard Ethernet protocol may be determined as the target protocol type of the first port.

In another optional implementation, if the first port detects a FlexE OH frame header, the first port may determine that the protocol type currently used by the second port to send information is the flexible Ethernet protocol. In this case, the first port adjusts a protocol used by the first port to receive information to the flexible Ethernet protocol, that is, the first port receives information according to the flexible Ethernet protocol. Further, the first port receives information sent by the second port. The information indicates that the protocol type supported by the second port is the flexible Ethernet protocol, and the information may be the extended LLDP TLV in this embodiment of this application and announce that the second port supports only the flexible Ethernet protocol. Therefore, the first port determines that the protocol type supported by the second port is the flexible Ethernet protocol, that is, the second port is in a single mode. Further, the flexible Ethernet protocol may be determined as the target protocol type of the first port.

In a third optional implementation, both the first port and the second port support two protocol types. When the first port and the second port are initialized, a protocol is randomly selected as a protocol to send information and receive information. In this case, the following three scenarios may occur. In each of the three scenarios, a temporary channel can be established, and the temporary channel may also be referred to as an LLDP unidirectional notification session. In a first possible scenario, both the first port and the second port are enabled by using the flexible Ethernet protocol. In this way, the first port and the second port may perform a session such as an LLDP layer session based on the flexible Ethernet protocol, so that the first port and the second port may perform a capability notification temporary session over a management channel in a FlexE overhead. To be specific, the second port sends the indication information used to indicate the protocol type supported by the second port. The indication information used to indicate the protocol type supported by the second port may b e carried in an LLDP packet.

In a second possible scenario, both the first port and the second port are enabled by using the standard Ethernet protocol. In this way, the first port and the second port may perform a session such as an LLDP layer session based on the standard Ethernet protocol, and perform a capability notification temporary session in an StdE mode. Therefore, the second port may send the indication information used to indicate the protocol type supported by the second port. The indication information used to indicate the protocol type supported by the second port may be carried in an LLDP packet.

In a third possible scenario, the first port is enabled by using the flexible Ethernet protocol, and the second port is enabled by using the standard Ethernet protocol. In this way, the first port and the second port may perform an asymmetric unidirectional temporary session in a selected mode. For example, the first port adjusts a protocol used to receive information to the standard Ethernet protocol, and the second port adjusts a protocol used to receive information to the flexible Ethernet protocol. However, a protocol used by the first port to send information is still the flexible Ethernet protocol, and a protocol used by the second port to send information is still the standard Ethernet protocol. In this way, the first port and the second port may send LLDP packets to each other, to notify each other of respectively supported protocol types.

In this embodiment of this application, if both the first port and the second port support two protocol types, when the first port further determines the target protocol type of the first port, the first port uses a solution consistent with a solution in which the second port further determines a target protocol type of the second port. For example, both the first port and the second port comply with some same rules. For example, the ports supporting two types of protocols both determine the flexible Ethernet protocol as the target protocol type. For another example, the ports supporting two types of protocols both determine the standard Ethernet protocol as the target protocol type. For another example, the ports supporting two types of protocols both determine the target protocol type with reference to the first indication information and the second indication information. For another example, the ports supporting two types of protocols both determine the target protocol type according to a rule such as a service or an actual application scenario. The target protocol type may be periodically updated or aperiodically updated based on a service, external input information, an actual application scenario, or the like in subsequent work of the port.

Figure 15:
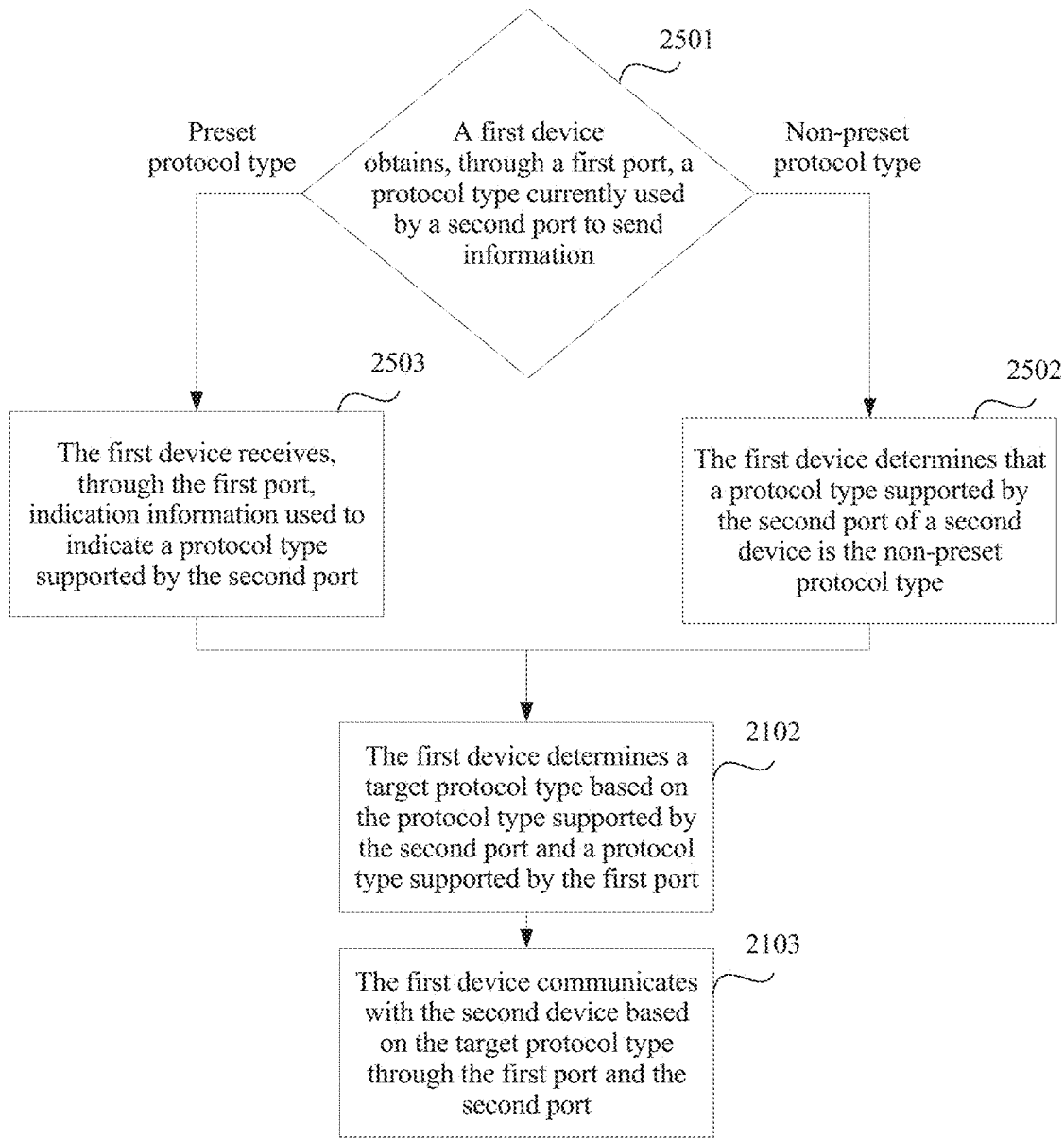
FIG. 15 is a schematic flowchart of another communication method according to an embodiment of this application.

To further reduce time overheads, FIG. 15 shows an example of a schematic flowchart of another communication method according to an embodiment of this application. In this example, a preset protocol type includes a flexible Ethernet protocol, and a non-preset protocol type includes a standard Ethernet protocol; or a preset protocol type includes a standard Ethernet protocol, and a non-preset protocol type includes a flexible Ethernet protocol. As shown in FIG. 15, the method includes the following steps.

Step 2501: A first device obtains a protocol type currently used by a second port to send information. For a specific manner of obtaining the protocol type currently used by the second port to send information, refer to the foregoing content. Details are not described herein again. Step 2502 is performed when it is determined that the obtained protocol type currently used by the second port to send information is the non-preset protocol type; or step 2503 is performed when it is determined that the obtained protocol type currently used by the second port to send information is the preset protocol type.

Step 2502: When determining that the obtained protocol type currently used by the second port to send information is the non-preset protocol type, a first device determines that a protocol type supported by the second port of a second device is the non-preset protocol type. Correspondingly, optionally, the second device sends information based on the preset protocol type when the second port supports the flexible Ethernet protocol and the standard Ethernet protocol. To be specific, in this case, indication information used to indicate the protocol type currently used by the second port to send information may also indicate the protocol type supported by the second port.

Step 2503: When a first device determines that the obtained protocol type currently used by the second port to send information is the preset protocol type, the first device receives, through the first port, indication information used to indicate a protocol type supported by the second port. Because the first port also supports two protocol types, protocol types currently used by the first port to receive information and send information each are the preset protocol type. To be specific, the first port receives, through the first port based on the preset protocol type, the indication information used to indicate the protocol type supported by the second port. In this step, optionally, the indication information used to indicate the protocol type supported by the second port may be information carried in an LLDP packet. In an optional implementation, the first port receives the indication information used to indicate the protocol type supported by the second port, and may directly determine, based on the indication information, the protocol type supported by the second port.

After step 2502 and step 2503 are performed, the protocol type supported by the second port is determined, and then step 2102 is performed. Step 2102: The first device determines a target protocol type based on the protocol type supported by the second port and a protocol type supported by the first port, where the target protocol type includes the flexible Ethernet protocol or the standard Ethernet protocol.

Step 2103: The first device communicates with the second device based on the target protocol type through the first port and the second port.

In this embodiment of this application, the indication information used to indicate the protocol type supported by the second port may be information carried in an LLDP packet, or an LLDP packet that carries the indication information used to indicate the protocol type supported by the second port may be referred to as an extended LLDP TLV in this embodiment of this application. FIG. 16 shows an example of a schematic diagram of an LLDP packet according to an embodiment of this application. As shown in FIG. 16, related information of a type value (TLV type)=127 (7 bits) may be placed in the $1^{st}$ byte. For example, the type value (TLV type) may be placed in the first 7 bits of the $1^{st}$ byte, for example, the type value may be 127. Related information of a length (length) (9 bits) may be placed in the $2^{nd}$ byte. The related information of the length occupies 9 bits. In this case, a last bit in the $1^{st}$ byte and the $2^{nd}$ byte may be used to carry the related information of the length. Information about an optical internetworking forum organizationally unique identifier (Optical Internetworking Forum organizationally unique identifier, OIF OUI), that is, 00-0F-40, may be placed in the 3$^{rd}$ to the 5$^{th}$ byte. Related information of a subtype (Subtype) 0x?? may be placed in the 6$^{th}$ byte. Related information of an interface capability (Interface capabilities) (1 byte) may be placed in the 7$^{th}$ byte. Related information of a flexible Ethernet protocol group capability token (FlexE Group Capability Key) (4 bytes) may be placed in the 8$^{th}$ byte to the 11$^{th}$ byte. Related information of a maximum quantity of interfaces supported in a flexible Ethernet group (Max #of PHYs in a FlexE group/subgroup) (1 byte) may be placed in the 12$^{th}$ byte. Related information to be determined (To be determined, TBD) may be placed in the 13$^{th}$ byte, for example, some information may be newly added subsequently.

As shown in FIG. 16, optionally, the LLDP packet that carries the indication information used to indicate the protocol type supported by the second port may include the protocol type supported by the second port. For example, in an example of the 7$^{th}$ byte in FIG. 16, if both the first and second bits are 1, it indicates that the second port supports the flexible Ethernet protocol and the standard Ethernet protocol. For another example, in an example of the 7$^{th}$ byte in FIG. 16, if the first and second bits are sequentially "1" and "0", it indicates that the second port supports the flexible Ethernet protocol. As shown in FIG. 16, the 6$^{th}$ byte identifies that a value of a subtype (Subtype) of a TLV is to be determined, and a location after the 12$^{th}$ byte is reserved for subsequent extension.

Further, optionally, the LLDP packet that carries the indication information used to indicate the protocol type supported by the second port may include the flexible Ethernet protocol group capability token (FlexE Group Capability Key), and a management module of the device may set ports having a same flexible Ethernet protocol group capability token value to be in one flexible Ethernet protocol group (FlexE Group). The flexible Ethernet protocol group may include at least one link, and a port corresponding to the link is configured to take effect.

In this embodiment of this application, determining of a target protocol type of a port and a port (effective) configuration phase may be related to configuration and effective establishment of a flexible Ethernet protocol group (FlexE Group) or a link aggregation group (Link Aggregation Group, LAG). The device may further determine a group identifier (Group ID) of the flexible Ethernet protocol group (FlexE Group) and a corresponding quantity of PHYs or a specific configuration of the LAG based on information such as a system ID, a port ID, and a flexible Ethernet protocol group capability token (FlexE Group Capability Key) of the device.

Further, optionally, the LLDP packet that carries the indication information used to indicate the protocol type supported by the second port may include a maximum quantity of interfaces supported in a flexible Ethernet group (Max #of PHYs in a FlexE group/subgroup), to indicate a maximum quantity of ports that can be included in a flexible Ethernet protocol group corresponding to the port.

Further, optionally, the management module of the device may determine a protocol type in a working state of each port by integrating information transmitted in the LLDP packet. For example, information that the management module of the first device needs to reference to determine the target protocol type of the first port or a protocol type in another working state may include the protocol type supported by the first port, the protocol type supported by the second port, a maximum quantity of ports corresponding to a link between the first port and the second port, a flexible Ethernet protocol group capability token corresponding to each port that can support the flexible Ethernet protocol on the first device, and the like.

A flexible Ethernet protocol group (FlexE Group) may be obtained by binding one to n Ethernet PHYs (namely, Ethernet physical layers), a flexible Ethernet protocol client (FlexE Clients) may be a MAC-based Ethernet data stream, and a service rate supported by FlexE 1.0 may be 10 Gb/s, 40 Gb/s, and m×25 Gb/s. A flexible Ethernet protocol layer (FlexE Shim) has a multiplexing function in a sending direction, and maps data of the flexible Ethernet protocol client (FlexE Clients) to the flexible Ethernet protocol group (FlexE Group). On the contrary, the flexible Ethernet protocol layer has a demultiplexing function in a receiving direction, and may demap the data from the flexible Ethernet protocol group (FlexE Group) to the flexible Ethernet protocol client (FlexE Clients).

In this embodiment of this application, when both the first device and the second device include a plurality of ports, a plurality of links may be established between the first device and the second device, for example, two 100 GEs layer-2 Ethernet connections and one 4×100G PHY flexible Ethernet protocol group (FlexE Group) may be established, so that the first device and the second device can perform bidirectional communication. Alternatively, Ethernet link aggregation may be performed on a plurality of flexible Ethernet protocol links.

It may be learned from the foregoing content that in this embodiment of this application, when both the first device and the second device include one port, any one of the foregoing solutions may be used. When the first device and the second device include a plurality of ports, a flexible Ethernet protocol group (FlexE Group) may be further established when the solutions shown in FIG. 14 to FIG. 16 are selected. In addition, this embodiment of this application may be better compatible with the prior art, and more information may be integrated to automatically determine a protocol type in a working state without changing a structure of an existing device.

When both the first port and the second port support two types of protocols, if it is preset that a port supporting two types of protocols is enabled by using a preset protocol type FlexE, the first port and the second port are first enabled in a FlexE mode, and notify a capability by using a MAC control packet of the LLDP protocol (that is, the first port sends indication information used to indicate the protocol type supported by the first port, and the second port sends the indication information used to indicate the protocol type supported by the second port).

An example is provided for description. The first port sends indication information used to indicate a protocol type currently used by the first port to send information, and the second port sends the indication information used to indicate the protocol type currently used by the second port to send information. The first port determines whether a 0x4B+0x5 code block (namely, a first preset PCS code block) is detected. If the code block is detected, it indicates that the protocol type currently used by the second port to send information is the FlexE, and the first port receives, over a management channel in the FlexE protocol mode, an LLDP control packet (including the indication information used to indicate the protocol type supported by the second port) sent by the second port. Alternatively, if the code block is not detected, the first port attempts to receive an LLDP control packet in a standard Ethernet protocol mode (it is not excluded that the LLDP control packet includes the indication information used to indicate the protocol type supported by the second port). Correspondingly, the second port determines whether a 0x4B+0x5 code block (namely, a first preset PCS code block) is detected. If the code block is detected, it indicates that the protocol type currently used by the first port to send information is the FlexE, and the second port receives, over a management channel in the FlexE protocol mode, an LLDP control packet (including the indication information used to indicate the protocol type supported by the first port) sent by the first port. Alternatively, if the code block is not detected, the first port attempts to receive an LLDP control packet in a standard Ethernet protocol mode (it is not excluded that the LLDP control packet includes the indication information used to indicate the protocol type supported by the first port).

Figure 17:
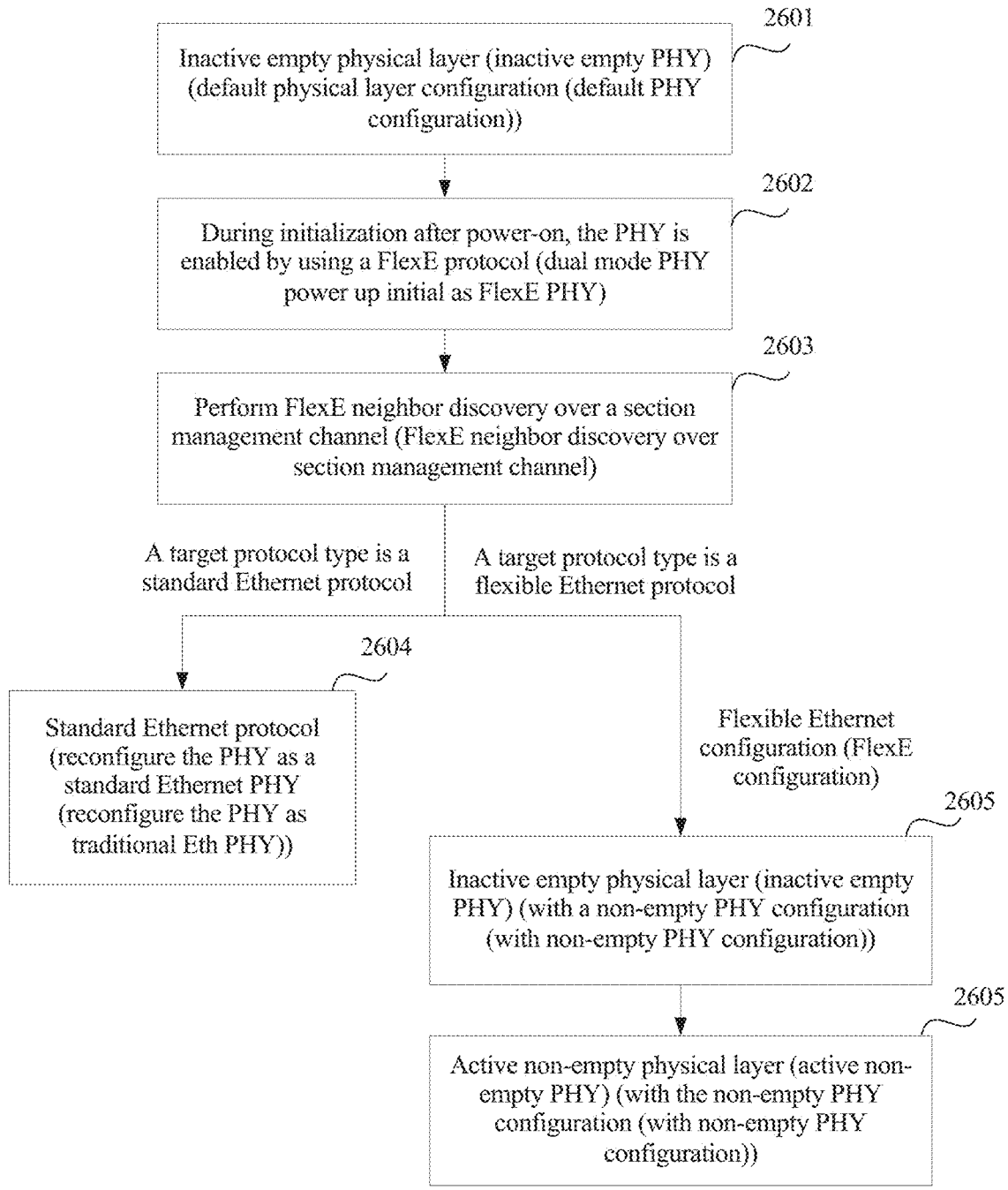
FIG. 17 is a schematic flowchart of a communication method according to an embodiment of this application.

FIG. 17 shows an example of a schematic flowchart of a communication method according to an embodiment of this application. A port shown in FIG. 17 is a port supporting two types of protocols, and may be the foregoing first port, or may be the foregoing second port when the second port supports two types of protocols. A configuration state of the port supporting two types of protocols in each phase is as follows.

Step 2601: In an initial phase, a physical layer state of the port may be inactive empty (inactive empty), and a physical layer configuration may be a default physical layer configuration (default PHY configuration) (that is, the PHY configuration is NULL), and optionally, step 2602 and step 2603 may be performed subsequently.

Step 2602: After a link is powered on, that is, after the link is enabled, the port that can support two protocol types is fixedly enabled in a flexible Ethernet protocol type (dual mode PHY power up initial as FlexE PHY), that is, the port sends and receives information according to a flexible Ethernet protocol.

Step 2603: Perform FlexE neighbor discovery over a section management channel (FlexE neighbor discovery over section management channel), that is, perform a temporary session (which may be the temporary session shown in FIG. 15, such as the temporary session in step 2501, step 2502, and step 2503) on a FlexE section management channel (FlexE section management channel), to determine a protocol type supported by a second port; and perform step 2604 if it is determined that a target protocol type is a standard Ethernet protocol; or perform step 2605 if it is determined that a target protocol type is the flexible Ethernet protocol.

Step 2604: Configure a PHY as a conventional Ethernet PHY (standard Ethernet protocol), that is, reconfigure the PHY as a standard Ethernet PHY (reconfigure the PHY as traditional Eth PHY).

Step 2605: First change PHY configuration information to be non-empty, and then enable the PHY configuration information to be active. To be specific, the PHY is first configured as an inactive empty PHY (inactive empty PHY) (with a non-empty PHY configuration (with non-empty PHY configuration)), and then the PHY is configured as an active non-empty physical layer (active non-empty PHY) (with the non-empty PHY configuration (with non-empty PHY configuration)).

Figure 18:
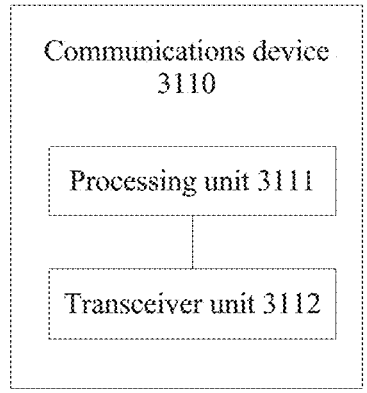
FIG. 18 is a schematic structural diagram of a communications device according to an embodiment of this application.

Based on the foregoing embodiments and a same concept, FIG. 18 is a schematic diagram of a communications device according to an embodiment of this application. As shown in FIG. 18, the communications device 3110 may be user equipment or a network device, or may be a chip or a circuit, such as a chip or a circuit that can be disposed in user equipment or a network device. The communications device may correspond to the first device in the foregoing method.

The communications device may implement steps performed by the first device in any one or more corresponding methods shown in FIG. 1 to FIG. 17. The communications device may include a processing unit 3111 and a transceiver unit 3112.

The transceiver unit 3112 may be the first port in the foregoing content, a unit disposed in the first port, or a unit bound to the first port. Information sent or received by the transceiver unit 3112 is transmitted through the first port. In a possible design, the communications device 3110 may be the first device 1101 in FIG. 1 in the foregoing content. The processing unit 3111 may be integrated into the management module 1102, may be integrated into the first port, or may exist in the first device 1101 independent of the management module 1102 and the first port.

In the following, this embodiment focuses on describing a function of the transceiver unit 3112 serving as a unit of a receive end when the first device serves as the receive end. The transceiver unit 3112 may also perform a related solution performed when the first device serves as a transmit end. For a method procedure performed when the transceiver unit 3112 serves as a unit of the transmit end, refer to the foregoing related solution of the second port.

The processing unit 3111 obtains a protocol type supported by a second port of a second device, and determines a target protocol type based on the protocol type supported by the second port and a protocol type supported by the first port. The target protocol type includes a flexible Ethernet protocol or a standard Ethernet protocol, the protocol type supported by the second port of the second device includes the flexible Ethernet protocol and/or the standard Ethernet protocol, and the first port of the first device supports the flexible Ethernet protocol and the standard Ethernet protocol. The transceiver unit 3112 is configured to communicate with the second device based on the target protocol type through the first port and the second port.

In a possible design, the transceiver unit 3112 is configured to send information to the second port of the second device based on the target protocol type through the first port. In a possible design, the transceiver unit 3112 is configured to receive, based on the target protocol type through the first port, information sent from the second port of the second device. In a possible design, the transceiver unit 3112 is configured to send information to the second port of the second device based on the target protocol type through the first port, and receive, based on the target protocol type through the first port, information sent from the second port of the second device.

In a possible design, the processing unit 3111 is configured to obtain, by using a physical coding sublayer PCS code block, a protocol type currently used by the second port to send information.

In a possible design, the processing unit 3111 is configured to: when a first preset PCS code block is received by using the transceiver unit 3112, determine that the protocol type currently used by the second port to send information is the flexible Ethernet protocol; or when a first preset PCS code block is not received by using the transceiver unit 3112, determine that the protocol type currently used by the second port to send information is the standard Ethernet protocol.

In a possible design, the transceiver unit 3112 is configured to receive, through the first port based on the obtained protocol type currently used by the second port to send information, indication information used to indicate the protocol type supported by the second port.

In a possible design, the indication information used to indicate the protocol type supported by the second port is carried in a control packet at a medium access control MAC layer; or the indication information used to indicate the protocol type supported by the second port is carried in a control packet at another layer higher than a MAC layer.

In a possible design, the processing unit 3111 is configured to: when determining that the obtained protocol type currently used by the second port to send information is a non-preset protocol type, determine that the protocol type supported by the second port of the second device is the non-preset protocol type. A preset protocol type includes the flexible Ethernet protocol, and the non-preset protocol type includes the standard Ethernet protocol; or a preset protocol type includes the standard Ethernet protocol, and the non-preset protocol type includes the flexible Ethernet protocol.

In a possible design, the processing unit 3111 is configured to obtain, by using the PCS code block, the protocol type supported by the second port.

The processing unit 3111 determines that the second port supports a plurality of protocol types. For example, at least one of the following content may be included. In a possible design, the processing unit 3111 is configured to: when a second preset PCS code block is received by using the transceiver unit 3112, determine that the protocol type supported by the second port includes the flexible Ethernet protocol and the standard Ethernet protocol. In a possible design, the processing unit 3111 is configured to: when a second preset PCS code block is not received by using the transceiver unit 3112 and the first preset PCS code block is received, determine that the protocol type supported by the second port is the flexible Ethernet protocol. In a possible design, the processing unit 3111 is configured to: when neither a second preset PCS code block nor the first preset PCS code block is received by using the transceiver unit 3112, determine that the protocol type supported by the second port is the standard Ethernet protocol.

In a possible design, the first preset PCS code block includes an OH frame header code block of the flexible Ethernet protocol.

It may be understood that for functions of the units in the communications device 3110, refer to implementation of a corresponding method embodiment. Details are not described herein again.

Figure 19:
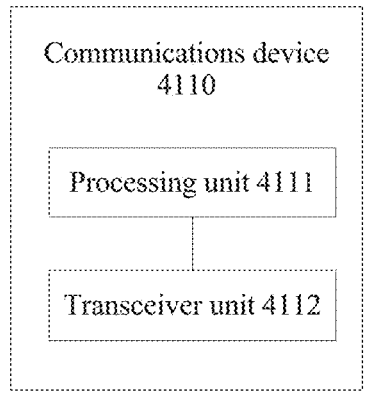
FIG. 19 is a schematic structural diagram of a communications device according to an embodiment of this application.

Based on the foregoing embodiments and a same concept, FIG. 19 is a schematic diagram of a communications device according to an embodiment of this application. As shown in FIG. 19, the communications device 4110 may be user equipment or a network device, or may be a chip or a circuit, such as a chip or a circuit that can be disposed in user equipment or a network device. The communications device may correspond to the second device in the foregoing method. The communications device may implement steps performed by the second device in any one or more corresponding methods shown in FIG. 1 to FIG. 17. The communications device may include a processing unit 4111 and a transceiver unit 4112.

The transceiver unit 4112 may be the second port in the foregoing content, a unit disposed in the second port, or a unit bound to the second port. Information sent or received by the transceiver unit 4112 is transmitted through the second port. In a possible design, the communications device 4110 may be the second device 1201 in FIG. 1 in the foregoing content. The processing unit 4111 may be integrated into the management module 1202, may be integrated into the second port, or may exist in the second device 1201 independent of the management module 1202 and the second port.

In the following, this embodiment focuses on describing a function of the transceiver unit 4112 serving as a unit of a transmit end when the second device serves as the transmit end. The transceiver unit 4112 may also perform a related solution performed when the second device serves as a receive end. When the transceiver unit 4112 serves as a unit of the receive end, and the second port supports two protocol types, for a method procedure performed by the transceiver unit 4112, refer to the foregoing related solution of the first port.

The processing unit 4111 is configured to generate indication information used to indicate a protocol type supported by the second port of the second device, and the protocol type supported by the second port of the second device includes a flexible Ethernet protocol and/or a standard Ethernet protocol. The transceiver unit 4112 is configured to send the indication information used to indicate the protocol type supported by the second port.

In a possible design, the transceiver unit 4112 is configured to send, by using a physical coding sublayer PCS code block, indication information used to indicate a protocol type currently used by the second port to send information.

In a possible design, when the protocol type currently used by the second port to send information is the flexible Ethernet protocol, the processing unit 4111 sends a first preset PCS code block by using the transceiver unit 4112.

In a possible design, the processing unit 4111 is configured to: when the second port supports the flexible Ethernet protocol and the standard Ethernet protocol, send information based on a preset protocol type by using the transceiver unit 4112.

If the preset protocol type is the flexible Ethernet protocol, the information includes the first preset PCS code block; or if the preset protocol type is the standard Ethernet protocol, the information does not include the first preset PCS code block.

In a possible design, the indication information used to indicate the protocol type supported by the second port of the second device is carried in a control packet at a medium access control MAC layer; or the indication information used to indicate the protocol type supported by the second port of the second device is carried in a control packet at another layer higher than a MAC layer.

In a possible design, the indication information used to indicate the protocol type supported by the second port is carried in the PCS code block.

In a possible design, the processing unit 4111 is configured to: when the second port supports the flexible Ethernet protocol and the standard Ethernet protocol, send, by using the transceiver unit 4112, information including a second preset PCS code block.

The processing unit 4111 is configured to: when the second port supports the flexible Ethernet protocol, send, by using the transceiver unit 4112, information that does not include a second preset PCS code block and includes the first preset PCS code block.

The processing unit 4111 is configured to: when the second port supports the standard Ethernet protocol, send, by using the transceiver unit 4112, information including neither a second preset PCS code block nor the first preset PCS code block.

In a possible design, the first preset PCS code block includes an OH frame header code block of the flexible Ethernet protocol.

In a possible design, the protocol type supported by the second port includes the flexible Ethernet protocol and the standard Ethernet protocol. The transceiver unit 4112 is further configured to send first indication information; or the transceiver unit 4112 is further configured to send first indication information and second indication information. The first indication information is used to indicate a protocol type with a higher priority in the protocol type supported by the second port, and the second indication information is used to indicate a priority level of the protocol type with a higher priority in the protocol type supported by the second port.

It may be understood that for functions of the units in the communications device 4110, refer to implementation of a corresponding method embodiment. Details are not described herein again.

Figure 20:
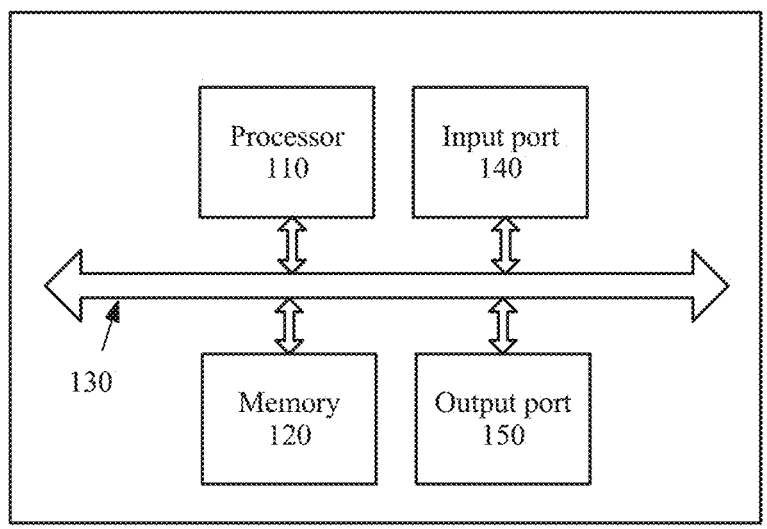
FIG. 20 is a schematic structural diagram of a communications device according to an embodiment of this application.

Based on the foregoing method, FIG. 20 is a schematic structural diagram of a communications device according to an embodiment of this application. As shown in FIG. 20, the communications device may be user equipment or a network device 20, or may be a chip or a circuit, such as a chip or a circuit that can be disposed in user equipment, or a chip or a circuit that can be disposed in a network device.

When the communications device corresponds to the first device in the foregoing method, the communications device may include a processor 110 and a memory 120. The memory 120 is configured to store an instruction. The processor 110 is configured to execute the instruction stored in the memory 120, to implement the related solution of the first device in one or more corresponding methods shown in FIG. 1 to FIG. 17.

Further, the device may include an input port 140 and an output port 150. Further, the device may include a bus system 130, and the processor 110, the memory 120, the input port 140, and the output port 150 may be connected by using the bus system 130. The input port 140 and the output port 150 correspond to a first port, that is, information received by the input port 140 and information sent by the output port 150 are transmitted through the first port. The input port 140 and the output port 150 may be integrated into the first port, or may be in a binding relationship with the first port.

The processor 110 is configured to execute the instruction stored in the memory 120, to control the input port 140 to receive a signal and control the output port 150 to send a signal, to complete the steps of the first device in the foregoing method. The input port 140 and the output port 150 may be a same physical entity or different physical entities. When the input port 140 and the output port 150 are a same physical entity, the input port 140 and the output port 150 may be collectively referred to as an input/output port, or may be referred to as a transceiver. The memory 120 may be integrated into the processor 110, or the memory 120 and the processor 110 may be disposed separately.

In an implementation, it may be considered that functions of the input port 140 and the output port 150 are implemented by using a transceiver circuit or a dedicated transceiver chip. It may be considered that the processor 110 is implemented by using a dedicated processing chip, processing circuit, or processor, or a universal chip.

In another implementation, it may be considered that the communications device provided in this embodiment of this application is implemented by using a general purpose computer. To be specific, program code for implementing functions of the processor 110, the input port 140, and the output port 150 are stored in the memory, and a general purpose processor implements the functions of the processor 110, the input port 140, and the output port 150 by executing the code in the memory.

For a concept, explanations, detailed descriptions, and other steps used in the device that are related to the technical solution provided in this embodiment of this application, refer to the descriptions of the content in the foregoing method or in another embodiment. Details are not described herein again.

Figure 21:
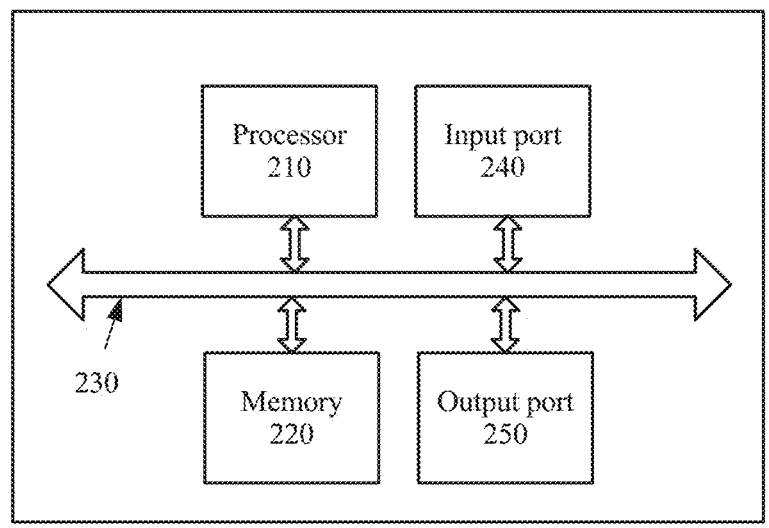
FIG. 21 is a schematic structural diagram of a communications device according to an embodiment of this application.

Based on the foregoing method, FIG. 21 is a schematic structural diagram of a communications device according to an embodiment of this application. As shown in FIG. 21, the communications device may be user equipment or a network device 20, or may be a chip or a circuit, such as a chip or a circuit that can be disposed in user equipment, or a chip or a circuit that can be disposed in a network device.

When the communications device corresponds to the second device in the foregoing method, the communications device may include a processor 210 and a memory 220. The memory 220 is configured to store an instruction. The processor 210 is configured to execute the instruction stored in the memory 220, to implement the related solution of the second device in one or more corresponding methods shown in FIG. 1 to FIG. 17.

Further, the device may include an input port 240 and an output port 250. Further, the device may include a bus system 230, and the processor 210, the memory 220, the input port 240, and the output port 250 may be connected by using the bus system 230. The input port 240 and the output port 250 correspond to a second port, that is, information received by the input port 240 and information sent by the output port 250 are transmitted through the second port. The input port 240 and the output port 250 may be integrated into the second port, or may be in a binding relationship with the second port.

The processor 210 is configured to execute the instruction stored in the memory 220, to control the input port 240 to receive a signal and control the output port 250 to send a signal, to complete the steps of the second device in the foregoing method. The input port 240 and the output port 250 may be a same physical entity or different physical entities. When the input port 240 and the output port 250 are a same physical entity, the input port 240 and the output port 250 may be collectively referred to as an input/output port, or may be referred to as a transceiver. The memory 220 may be integrated into the processor 210, or the memory 220 and the processor 210 may be disposed separately.

In an implementation, it may be considered that functions of the input port 240 and the output port 250 are implemented by using a transceiver circuit or a dedicated transceiver chip. It may be considered that the processor 210 is implemented by using a dedicated processing chip, processing circuit, or processor, or a universal chip.

In another implementation, it may be considered that the user equipment provided in this embodiment of this application is implemented by using a general purpose computer. To be specific, program code for implementing functions of the processor 210, the input port 240, and the output port 250 are stored in the memory, and the general purpose processor implements the functions of the processor 210, the input port 240, and the output port 250 by executing the code in the memory.

For a concept, explanations, detailed descriptions, and other steps used in the device that are related to the technical solution provided in this embodiment of this application, refer to the descriptions of the content in the foregoing method or in another embodiment. Details are not described herein again.

Figure 22:
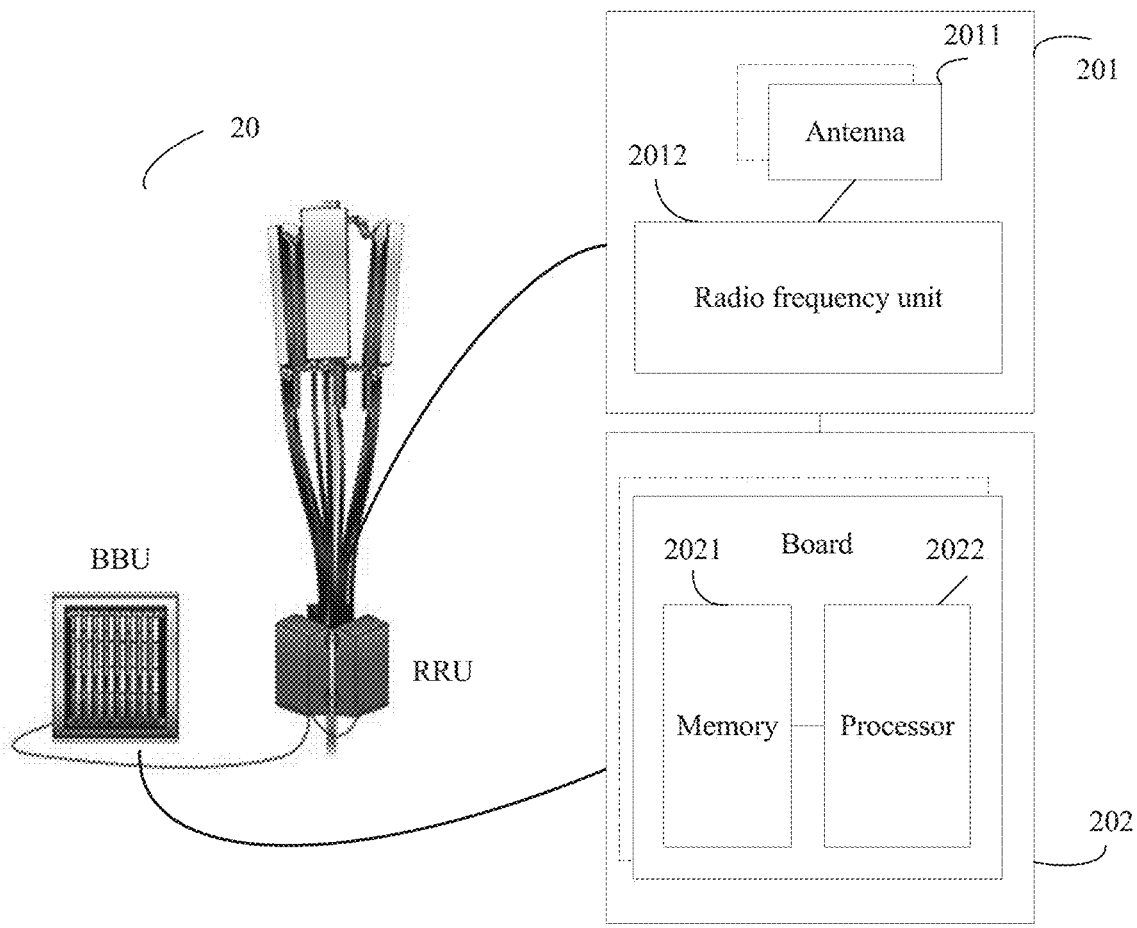
FIG. 22 is a schematic structural diagram of a network device according to an embodiment of this application.

According to the foregoing method, FIG. 22 is a schematic structural diagram of a network device according to an embodiment of this application, for example, may be a schematic structural diagram of a base station. As shown in FIG. 22, the base station may be applied to the first device or the second device shown in FIG. 1. The base station 20 includes one or more radio frequency units such as a remote radio unit (remote radio unit, RRU) 201 and one or more baseband units (baseband unit, BBU) (which may also be referred to as digital units (digital unit, DU)) 202. The RRU 201 may be referred to as a transceiver unit, a transceiver, a transceiver circuit, a transceiver, or the like, and may include at least one antenna 2011 and a radio frequency unit 2012. The RRU 201 is mainly configured to receive and send a radio frequency signal and perform conversion between the radio frequency signal and a baseband signal.

The BBU 202 is mainly configured to perform baseband processing, control the base station, and the like. The RRU 201 and the BBU 202 may be physically disposed together, or may be physically disposed separately, that is, the base station is a distributed base station.

The BBU 202 is a control center of the base station, may also be referred to as a processing unit, and is mainly configured to implement a baseband processing function, such as channel coding, multiplexing, modulation, and spectrum spreading.

For example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store necessary instructions and data. For example, the memory 2021 stores a protocol type supported by the first port and/or a protocol type supported by the second port in the foregoing embodiment.

The processor 2022 is configured to control the base station to perform a necessary action. For example, when the network device performs the solution performed by the foregoing first device, the processor may be configured to: obtain a protocol type supported by a second port of a second device; determine a target protocol type based on the protocol type supported by the second port and a protocol type supported by a first port; and communicate with the second device based on the target protocol type through the first port and the second port. For a related solution to obtaining the protocol type supported by the second port of the second device and another related solution of the first device, refer to the foregoing method procedure.

When the network device performs the solution performed by the foregoing second device, the processor may be configured to: generate indication information used to indicate a protocol type supported by a second port of the second device; and send, by using the transceiver unit, the indication information used to indicate the protocol type supported by the second port. For another related solution of the second device, refer to the foregoing method procedure.

The memory 2021 and the processor 2022 may serve one or more boards. In other words, a memory and a processor may be separately disposed on each board, or a plurality of boards may share a same memory and processor. In addition, a necessary circuit may be disposed on each board.

According to the method provided in the embodiments of this application, an embodiment of this application further provides a communications system, and the communications system includes the network device and one or more user equipments.

It should be understood that in the embodiments of this application, any of the processor 2022 in FIG. 22, the processor 110 in FIG. 20, and the processor 210 in FIG. 21 may be a central processing unit (Central Processing Unit, "CPU" for short), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In the embodiments of this application, any one of the memory 2021 in FIG. 22, the memory 120 in FIG. 20, and the memory 220 in FIG. 21 may include a read-only memory and a random access memory, and provide an instruction and data to the processor. A part of the memory may further include a nonvolatile random access memory.

In the embodiments of this application, the bus system may include a power bus, a control bus, a status signal bus, and the like in addition to a data bus. However, for clear description, various buses are marked as the bus system in the figure, for example, the bus system 130 in FIG. 20 and the bus system 230 in FIG. 21.

In an implementation process, steps in the foregoing methods can be implemented by using an integrated logical circuit of hardware in a processor, or by using instructions in a form of software. The steps of the method disclosed with reference to the embodiments of this application may be directly performed by a hardware processor, or may be performed by using a combination of hardware in a processor and a software unit. The software unit may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the foregoing methods in combination with hardware in the processor. To avoid repetition, details are not described herein.

It should be further understood that the first, the second, the third, the fourth, and various numbers in this specification are used for differentiation only for ease of description, instead of limiting the scope of the embodiments of this application.

It should be understood that the term "and/or" in this specification is merely an association relationship for describing associated objects and represents that three relationships may exist. For example, A and/or B may represent the following three cases: Only A exists, both A and B exist, and only B exists. In addition, unless otherwise specified, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with illustrative logical blocks (illustrative logical block) and steps (step) described in the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, device, and unit, refer to a corresponding process in the foregoing method embodiments. Details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general purpose computer, a dedicated computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method performed by a first device, comprising:
    obtaining, by the first device, a protocol type supported by a second port of a second device, wherein the protocol type supported by the second port of the second device is at least one of a flexible Ethernet protocol or a standard Ethernet protocol, and wherein a first port of the first device supports the flexible Ethernet protocol and the standard Ethernet protocol;
    obtaining, by the first device, a first protocol type used by the second port for transmission, wherein the obtaining, by the first device, a first protocol type used by the second port for transmission comprises:
    determining whether a first preset physical coding sublayer (PCS) code block is received; and
    in response to determining that the first preset PCS code block is not received, determining that the first protocol type used by the second port for transmission is the standard Ethernet protocol;
    determining, by the first device and based on the protocol type supported by the second port and a protocol type supported by the first port, whether a target protocol type is the flexible Ethernet protocol or the standard Ethernet protocol; and
    communicating, by the first device, with the second device based on the target protocol type through the first port and the second port.

2. The method according to claim 1, wherein the communicating, by the first device, with the second device based on the target protocol type through the first port and the second port comprises:
    sending, by the first device, first information to the second port of the second device based on the target protocol type through the first port.

3. The method according to claim 1, wherein the communicating, by the first device, with the second device based on the target protocol type through the first port and the second port comprises:
    receiving, by the first device based on the target protocol type through the first port, second information sent from the second port of the second device.

4. The method according to claim 1, wherein the obtaining, by the first device, a protocol type supported by a second port of a second device comprises:
    receiving, by the first device through the first port based on a protocol type currently used by the second port for transmission, indication information indicating the protocol type supported by the second port.

5. The method according to claim 4, wherein the indication information indicating the protocol type supported by the second port is carried in a control packet at a medium access control (MAC) layer; or
    the indication information indicating the protocol type supported by the second port is carried in a control packet at another layer higher than a MAC layer.

6. The method according to claim 1, wherein the obtaining, by the first device, a protocol type supported by a second port of a second device comprises:

when determining that the protocol type currently used by the second port for transmission is a non-preset protocol type, determining, by the first device, that the protocol type supported by the second port of the second device is the non-preset protocol type, wherein:
a preset protocol type comprises the flexible Ethernet protocol, and the non-preset protocol type comprises the standard Ethernet protocol; or a preset protocol type comprises the standard Ethernet protocol, and the non-preset protocol type comprises the flexible Ethernet protocol.

7. A communication method, comprising:
generating, by a second device, first indication information indicating a protocol type supported by a second port of the second device, wherein the protocol type supported by the second port of the second device is at least one of a flexible Ethernet protocol or a standard Ethernet protocol;
sending, by the second device, the first indication information indicating the protocol type supported by the second port; and
sending, by the second device, second indication information indicating a protocol type currently used by the second port for transmission, wherein the sending, by the second device, the second indication information indicating the protocol type supported by the second port comprises:
when the second port supports the flexible Ethernet protocol and the standard Ethernet protocol, sending, by the second device, the second indication information based on a preset protocol type, wherein the preset protocol type is the standard Ethernet protocol and the second indication information does not comprise a first preset physical coding sublayer (PCS) code block.

8. The method according to claim 7, wherein the first indication information indicating the protocol type supported by the second port of the second device is carried in a control packet at a medium access control (MAC) layer.

9. The method according to claim 7, wherein the first indication information indicating the protocol type supported by the second port of the second device is carried in a control packet at another layer higher than a MAC layer.

10. A first device, comprising:
at least one processor; and
at least one memories coupled to the at least one processor and storing programming instructions for execution by the at least one processor to perform operations comprising:
obtaining a protocol type supported by a second port of a second device, wherein the protocol type supported by the second port of the second device is at least one of a flexible Ethernet protocol or a standard Ethernet protocol, a first port of the first device supports the flexible Ethernet protocol and the standard Ethernet protocol;
obtaining a first protocol type used by the second port for transmission, wherein the obtaining, by the first device, a first protocol type used by the second port for transmission comprises:
determining whether a first preset physical coding sublayer (PCS) code block is received; and
in response to determining that the first preset PCS code block is not received, determining that the first protocol type used by the second port for transmission is the standard Ethernet protocol;
determining, based on the protocol type supported by the second port and a protocol type supported by the first port of the first device, whether a target protocol type is the flexible Ethernet protocol or the standard Ethernet protocol; and
communicating with the second device based on the target protocol type through the first port and the second port.

11. The first device according to claim 10, wherein the operations further comprise:
sending first information to the second port of the second device based on the target protocol type through the first port.

12. The first device according to claim 10, wherein the operations further comprise:
receiving based on the target protocol type through the first port, second information sent from the second port of the second device.

13. The first device according to claim 10, wherein the operations further comprise:
receiving, through the first port based on a protocol type currently used by the second port for transmission, indication information indicating the protocol type supported by the second port.

14. The first device according to claim 13, wherein the indication information indicating the protocol type supported by the second port is carried in a control packet at a medium access control (MAC) layer; or
the indication information indicating the protocol type supported by the second port is carried in a control packet at another layer higher than a MAC layer.

15. A second device, comprising:
at least one processor; and
at least one memories coupled to the at least one processor and storing programming instructions for execution by the at least one processor to perform operations comprising:
generating first indication information indicating a protocol type supported by a second port of the second device, wherein the protocol type supported by the second port of the second device is at least one of a flexible Ethernet protocol or a standard Ethernet protocol;
sending the first indication information indicating the protocol type supported by the second port; and
sending second indication information indicating a protocol type currently used by the second port for transmission, wherein the sending, by the second device, the second indication information indicating the protocol type supported by the second port comprises:
when the second port supports the flexible Ethernet protocol and the standard Ethernet protocol, sending the second indication information based on a preset protocol type, wherein the preset protocol type is the standard Ethernet protocol and the second indication information does not comprise a first preset physical coding sublayer (PCS) code block.

16. The second device according to claim 15, wherein the first indication information indicating the protocol type supported by the second port of the second device is carried in a control packet at a medium access control (MAC) layer.

17. The second device according to claim 15, wherein
the first indication information indicating the protocol type supported by the second port of the second device is carried in a control packet at another layer higher than a MAC layer.

18. A communication system comprising a first device and a second device, wherein the first device and the second device are configured to perform operations comprising:

obtaining, by the first device, a protocol type supported by a second port of a second device, wherein the protocol type supported by the second port of the second device is at least one of a flexible Ethernet protocol or a standard Ethernet protocol, and a first port of the first device supports the flexible Ethernet protocol and the standard Ethernet protocol;

generating, by the second device, first indication information used to indicate the protocol type supported by the second port of the second device;

sending, by the second device, the first indication information used to indicate the protocol type supported by the second port;

obtaining, by the first device, a first protocol type used by the second port for transmission, wherein the obtaining, by the first device, a first protocol type used by the second port for transmission comprises:

determining whether a first preset physical coding sublayer (PCS) code block is received; and in response to determining that the first preset PCS code block is not received, determining that the first protocol type used by the second port for transmission is the standard Ethernet protocol;

determining, by the first device and based on the protocol type supported by the second port and a protocol type supported by the first port, whether a target protocol type is the flexible Ethernet protocol or the standard Ethernet protocol; and communicating, by the first device with the second device based on the target protocol type through the first port and the second port.

19. The communication system according to claim 18, wherein the operations further comprise:

sending, by the second device, second indication information indicating a protocol type currently used by the second port for transmission, wherein the sending, by the second device, the second indication information indicating the protocol type supported by the second port comprises:

when the second port supports the flexible Ethernet protocol and the standard Ethernet protocol, sending, by the second device, the second indication information based on a preset protocol type, wherein the preset protocol type is the standard Ethernet protocol and the second indication information does not comprise a first preset physical coding sublayer (PCS) code block.

20. The communication system according to claim 18, wherein the operations further comprise:

sending, by the first device, first information to the second port of the second device based on the target protocol type through the first port.

21. The communication system according to claim 18, wherein the operations further comprise:

receiving, by the first device based on the target protocol type through the first port, second information sent from the second port of the second device.

22. The communication system according to claim 18, wherein the first indication information indicating the protocol type supported by the second port of the second device is carried in a control packet at a medium access control (MAC) layer.

23. The communication system according to claim 18, wherein the first indication information indicating the protocol type supported by the second port of the second device is carried in a control packet at another layer higher than a MAC layer.

* * * * *